United States Patent
Gupta et al.

(10) Patent No.: US 9,911,134 B2
(45) Date of Patent: Mar. 6, 2018

(54) RECIPIENT CENTRIC MESSAGING SYSTEM AND PROTOCOLS TO IMPLEMENT IT OVER DATA NETWORKS

(71) Applicant: Zipstorm Inc., Bellevue, WA (US)

(72) Inventors: Anoop Gupta, Bellevue, WA (US); Aravind Bala, Redmond, WA (US)

(73) Assignee: Zipstorm, Inc., Bellevue, WA (US)

( * ) Notice: Subject to any disclaimer, the term of this patent is extended or adjusted under 35 U.S.C. 154(b) by 0 days.

(21) Appl. No.: 15/410,006

(22) Filed: Jan. 19, 2017

(65) Prior Publication Data

US 2017/0206545 A1    Jul. 20, 2017

Related U.S. Application Data

(60) Provisional application No. 62/280,772, filed on Jan. 20, 2016.

(51) Int. Cl.
*G06Q 30/00* (2012.01)
*G06Q 30/02* (2012.01)
*H04L 29/08* (2006.01)
*H04L 12/58* (2006.01)

(52) U.S. Cl.
CPC ......... *G06Q 30/0226* (2013.01); *H04L 51/04* (2013.01); *H04L 51/16* (2013.01); *H04L 51/22* (2013.01); *H04L 51/32* (2013.01); *H04L 67/2804* (2013.01); *H04L 67/306* (2013.01)

(58) Field of Classification Search
USPC ................ 705/14, 14.1, 14.4; 709/203, 206; 358/452
See application file for complete search history.

(56) References Cited

U.S. PATENT DOCUMENTS

| | | | | |
|---|---|---|---|---|
| 5,794,210 A | * | 8/1998 | Goldhaber | ......... G06Q 30/0207 705/14.69 |
| 8,141,133 B2 | * | 3/2012 | Pagan | ..................... H04L 51/04 713/182 |
| 8,386,576 B2 | * | 2/2013 | Anderson | ............. G06F 3/0481 709/204 |
| 9,319,443 B2 | * | 4/2016 | O'Hare | ............... H04L 65/4069 |
| 9,787,626 B2 | * | 10/2017 | Anderson | ............... H04L 51/26 |
| 9,823,806 B2 | * | 11/2017 | Schoen | ................. G06F 3/0481 |

(Continued)

*Primary Examiner* — Luis A Brown
(74) *Attorney, Agent, or Firm* — Brokaw Patent Law PC; Christopher J. Brokaw

(57) ABSTRACT

A method of communicating messages between a sender and a recipient using a communications protocol over a data network, which includes: (a) receiving communication preferences specified by the recipient that includes constraints required to be met for delivery of a message, (ii) publishing the profile with visible preferences from the communication preferences of the recipient when the sender selects the recipient to send the message, (iii) processing a request received from the sender to send the message to the recipient, (iv) generating a customized message form based on the communication preferences of the recipient to enable the sender to compose the message, (v) providing an indication to the sender if any of the constraints are not met, and (vi) delivering the message to the recipient when the constraints specified by the recipient and any constraints applied by a messaging system are met by the message.

30 Claims, 28 Drawing Sheets

(56) References Cited

U.S. PATENT DOCUMENTS

| | | | | |
|---|---|---|---|---|
| 2007/0146812 A1* | 6/2007 | Lawton | G06Q 30/02 | 358/452 |
| 2007/0150537 A1* | 6/2007 | Graham | G06Q 30/02 | 709/203 |
| 2007/0226300 A1* | 9/2007 | Smith | H04L 51/30 | 709/206 |
| 2008/0196094 A1* | 8/2008 | Benschop | G06Q 20/10 | 726/5 |
| 2009/0018904 A1* | 1/2009 | Shipman | G06Q 30/0269 | 705/14.66 |
| 2009/0203359 A1* | 8/2009 | Makhoul | G06Q 30/02 | 455/412.2 |
| 2009/0265733 A1* | 10/2009 | McKelvey | H04N 21/23424 | 725/32 |
| 2010/0088185 A1* | 4/2010 | Wen | G06Q 30/02 | 705/14.72 |
| 2012/0054680 A1* | 3/2012 | Moonka | G06Q 30/0269 | 715/810 |
| 2013/0013705 A1* | 1/2013 | White | G06F 21/6218 | 709/206 |
| 2013/0326221 A1* | 12/2013 | Murphy | H04L 51/24 | 713/168 |
| 2015/0079965 A1* | 3/2015 | Mullins | H04W 12/08 | 455/419 |
| 2016/0292161 A1* | 10/2016 | Liu | G06Q 10/1053 | |
| 2017/0206545 A1* | 7/2017 | Gupta | G06Q 30/0226 | |

* cited by examiner

XYZ.COM | ENTER A PERSON'S NAME

JANE REED | XYZ.COM

Http://xyz.com/home

PICK YOUR USER NAME

XYZ.COM/@  JANE REED

ADD A HEADLINE/SUMMARY  10% COMPLETE

<HEADLINE FROM TWITTER> — 402

PICK A PROFILE PICTURE

TWITTER PROFILE PIC

UPLOAD...

ADVICE FOR CONTACTING YOU

404

ADD A BACKGROUND PHOTO

WHAT TYPES OF MESSAGES ARE YOU WILLING TO RECEIVE? — 406

☐ CAREER OPPORTUNITIES  ☐ STORIES  ☐ NEW VENTURES
☐ PERSONAL MESSAGES  ☐ PRODUCT PITCHES  ☐ JOB ENQUIRIES
☐ CONSULTING OFFERS  ☐ EXPERTISE REQUESTS  ☐ INFORMATION
☐ BUSINESS DEALS  ☐ SALES OFFERS  ☐ INVESTMENT OPPORTUNITIES

ADD CUSTOM CATEGORIES:

<ADD CATEGORY 1>  <ADD CATEGORY 1>  <ADD CATEGORY 1> — 407

JANE REED ⌄

NEXT

New Message

New Messages (1) ⌄

Search 🔍

JOHN SMITH 1/4/17 ✕
Text Message
Hi Jane. I have attached my start-up Pitch.

---

Text Message

[MIN]

Sender confirms that they comply with your preferences. Please be sure to rate the message to keep the system safe and spam-free.

Tip: you are under no obligation to reply, and you can close the conversation at any time.

...

JOHN SMITH JAN 14, 1:04 AM
Hi Jane. I have attached my start-up Pitch. Please share your feedback.

YOU JAN 15, 8:28 AM
Hi John. Technology looks impressive. The business model might need some work though.

YOU
Thanks Jane, what are your plans for this weekend?

YOU
Reply Message

Low  Medium  High  | Promo  Offensive

Rate Relevance (?)        Reply

---

JANE REED / @JANE REED
Verified Accounts
About Jane Reed
Check out other members

BRAYDEN
Full Stack Software Engineer at Zipstorm

VALENTINA
Student at University of Portland
Portland, OR, USA.

FIG. 14B

RECIPIENT CENTRIC MESSAGING SYSTEM AND PROTOCOLS TO IMPLEMENT IT OVER DATA NETWORKS

BACKGROUND

Technical Field

The embodiments herein generally relate to information and communications technology, and more particularly to a recipient centric messaging system and protocols used to implement the recipient centric messaging system over data networks.

Description of the Related Art

Communication is fundamental to how humans function in social and business settings. Electronic devices are prominently used for communication over data networks. A data network is a telecommunication network that allows electronic devices to exchange data with each other along network links or data connections that are established using either wired or wireless media. The best-known data network is the Internet. The Internet has brought about a revolution in communication by enabling synchronous as well as asynchronous communication.

One of the oldest forms of asynchronous communication is email, which is particularly prevalent among first generation Internet users and is often used as a preferred form of communication, particularly at the workplace. Email is sender centric in that once a sender has a recipient's address, he/she can send any type of message or any number of messages to that recipient. In email, there is no way for the recipient to control the content of received messages (e.g. attachments, images, etc.). Email is very easy to access and there is no cost to send bulk messages, but as a result, low-quality content, irrelevant, and/or inappropriate messages get sent, which recipients are responsible for filtering out. Hence it has become a huge challenge for most of us to prioritize and focus on the emails that deserve our attention over the ones that don't. Since each of us has a limited amount of time and attention, those of us who are unable to prioritize end up being less productive at work and/or losing control of our work-life balance or end up missing on important messages that get misclassified as spam.

There are numerous email client-apps and free email services available, and many of them have sophisticated spam filtering techniques to help users with this deluge of email but they are still noisy. Furthermore, even legitimate messages can be lost while filtering spam. The Simple Mail Transfer Protocol (SMTP) is the Internet standard used to carry email. In the process of transporting email messages between systems, the SMTP communicates delivery parameters using a message envelope that is separate from the message (e.g., header and body) itself. Although electronic mail servers and other mail transfer agents use SMTP to send and receive mail messages, user-level client mail applications typically use SMTP only for sending messages to a mail server for relaying. For receiving messages, client applications usually use protocols such as POP3 or IMAP.

Although proprietary systems (e.g., Microsoft Exchange and IBM Notes) and webmail systems (e.g., Outlook.com, Gmail and Yahoo! Mail) use their own non-standard protocols to access mail box accounts on their own mail servers, they use SMTP when sending or receiving email from outside their own systems. Current email protocols and systems have no way of enforcing constraints on messages since the existing protocols (e.g. SMTP, POP, IMAP and MAPI) are optimized to make sending messages easy and any email system has to comply with these protocols in order to send or receive email from outside their own systems. Given the large number of existing implementations of email clients, adding new protocols on top of the existing ones is very difficult. The power of email is its ubiquity and the variety of email clients that one can use, but this same variety makes it very challenging to change the email protocols. Once the email address is compromised to spammers, the only solution is to change the email address. At the same time, people often make it hard to find their email address to avoid getting irrelevant messages, which makes for the opposite challenge.

Professional networks like LinkedIn allow users to freely message people within their own professional networks, but impose restrictions on messaging people outside their network. Their business model is based on relaxing these restrictions by paying the third party a fee (e.g., a subscription). Nowadays digital advertising has become pervasive. It is embedded within websites, within feeds of Facebook, LinkedIn, Twitter etc., within news sites, within videos on YouTube, and so on. All of these advertisements are seeking your attention and your time and trying to influence you. The third party run websites claim to provide you with free services, (e.g., free news articles, free ways to store your photos and connect with your friends, free videos, and so on) in return for your attention and your time. Almost all of the revenue generated from advertising is, however, typically kept by the company providing the service, despite your contribution as a user by providing relevant content and your profile information that keeps other users interested in spending time on these websites. Many of these companies have become hugely profitable, like Facebook, Google, and LinkedIn.

The business model associated with such free-services and advertising has recently come into question in terms of the negative implications it has for the future of society. One book on the topic is "*Who Owns the Future?*" by Jaron Lanier. He posits that the middle class is increasingly disenfranchised from online economies. By convincing users to give away valuable information about themselves in exchange for free services, firms can accrue large amounts of data at virtually no cost. Lanier calls these firms "Siren Servers," alluding to the Sirens of Ulysses. Instead of paying each individual for their contribution to the data pool, the Siren Servers concentrate wealth in the hands of the few who control the data centers.

Further, since people are on multiple web sites, and each site has their own communication system, people need to manage their communication on multiple sites which leads to a fragmentation of time and attention. For example, an influential might get hundreds of messages per day across multiple communication channels with asks on his attention such as review requests, speaking engagement requests etc. and have full time staff to handle such requests. Many times messages might be lost if the influential did not check the message on the particular channel. Engineers might hear from recruiters more than ten times a week, but many of these messages might go to an email address that they don't check often.

Different people are likely to receive very different amounts of messages depending on where they live, their income level, their profile information etc. Job seekers might be open to receiving as many opportunities as possible. A large number of people might receive very few messages omen might be open to receiving relevant messages on sites like Quora, but many of them are bombarded with inappropriate messages. This is especially true if they have a photo on their profile where men send them dating requests etc.

Accordingly, there remain a need for a communication system that is (i) flexible and well-designed and provides a single place to check and reply to messages from people outside their social network and (ii) addresses concerns and needs of a multitude of users across different segments in a way that they are comfortable with having a public communication address.

SUMMARY

In view of the foregoing, an embodiment herein provides a method of communicating at least one message between a sender and a recipient using a communications protocol over a data network through a recipient centric messaging system. The method includes: (a) receiving communication preferences specified by the recipient that includes computer interpretable constraints required to be met for delivery of a first message and human interpreted constraints when the recipient creates or updates a profile on the recipient centric messaging system, (ii) publishing the profile with a set of visible preferences from the communication preferences of the recipient that are visible to the sender when the sender selects the recipient to send a message, (iii) processing a request received from the sender to send the first message to the recipient, (iv) generating a customized message form based on the communication preferences of the recipient to enable the sender to compose the first message to comply with the communication preferences, (v) providing an indication to the sender if any of the constraints are not met, and (vi) delivering the first message to the recipient if and only if all the computer interpretable constraints specified in the communication preferences of the recipient and any constraints applied by the recipient centric messaging system are met by the first message.

In one embodiment, the communication preferences include multiple categories of communications that are set up by the recipient based on (a) properties of senders, or (b) properties of communicated content. The different constraints are specified by the recipient for different categories of communications.

In another embodiment, the communications preferences are specified as a logic formula with (a) AND, (b) OR, and (c) NOT operators separating constraints, and the communications preferences includes at least one of: (i) a limit on a number of characters in the message, (ii) a specification on whether images or attachments are allowed or not, (iii) a compensation amount that is required for delivery of the message, (iv) a threshold reputation score of the sender required for delivery of the message, or (v) a volume of message traffic that is received by the recipient that is associated with a category of communication selected from the different categories of communications. In yet another embodiment, the compensation amount is suggested by the recipient centric messaging system based on at least one of (i) amounts associated with existing messages received by the recipient and priorities of the existing messages in order to increase a priority of the message for the recipient, (ii) one or more properties of content associated with the message. In yet another embodiment, the one or more properties of content includes a length of a video that is attached with the message, or (iii) an amount of attention required by the recipient.

In yet another embodiment, the method further includes the step of requesting the sender to certify that at least visible preferences out of the human interpreted preferences are satisfied by the message before sending the message. If the recipient reports that the sender has wrongly certified at least one of the visible preferences, the recipient centric messaging system blocks the sender from sending further messages to the recipient, or reduces at least one of (a) a reputation score of the sender, or (b) privileges of the sender. In yet another embodiment, the privileges include free messages provided to the recipient.

In yet another embodiment, the method further includes the step of allowing a limited number of free messages within a given time period if the sender and the recipient (a) share the same alma mater, (b) or previously worked for the same employer.

In yet another embodiment, the constraints applied by the recipient centric messaging system includes (a) a limit to a number of messages that the sender can send without a compensation amount. In yet another embodiment, the number of messages that are allowed to be sent without the compensation amount is determined based on (a) a reputation score of the sender, or (b) a regulation applicable to the recipient for receiving compensation.

In yet another embodiment, the communication preferences includes multiple categories of communications that are set up by the recipient based on (a) properties of senders, or (b) properties of communicated content. In yet another embodiment, the recipient specifies different constraints for different categories of communications.

In yet another embodiment, the communication preferences include an indication that one or more of the constraints are not enforced on one or more senders or types of senders.

In yet another embodiment, the request is received from the sender to send the first message when the sender selects a URL of a unique communication address associated with the recipient within the recipient centric messaging system from a source outside of the recipient centric messaging system.

In yet another embodiment, the method includes the steps of: (a) verifying whether the sender is logged on to the recipient centric messaging system or not, and (b) enabling the sender to login to the recipient centric messaging system if the sender is not already logged in to the recipient centric messaging system.

In yet another embodiment, the recipient centric messaging system automatically captures a URL of the source as metadata to be attached to the first message, and generates the customized message form based on the communication preferences of the recipient on selecting the URL once the sender is logged in to the recipient centric messaging system.

In yet another embodiment, the method further includes the step of filtering and classifying the messages in an inbox of the recipient in the recipient centric messaging system based on the URL of the source outside of the recipient centric messaging system.

In yet another embodiment, the method further includes the steps of: (a) delivering the first message to the recipient if and only if a minimum compensation amount is attached with the first message, and (b) returning at least a part of the compensation amount to the sender when the recipient does not send a reply to the message within a predefined period of time.

In yet another embodiment, the recipient centric messaging system does not deliver the first message to the recipient if a reputation score of the sender is lesser than the threshold reputation score specified in the communication preferences.

In yet another embodiment, the method further includes the step of verifying the message and when at least one of the constraints specified in the communication preferences or the constraints specified by the recipient centric messaging system is not met by the message, not delivering the message, notifying the sender that at least one of the constraints is not met, and enabling the sender to modify the message to meet the constraints.

In yet another embodiment, the method further includes the steps of: (a) processing a first reply from the recipient to the first message, and (b) crediting a first compensation amount associated with the first message by the sender to the recipient only when the recipient sends the first reply to the sender.

In yet another embodiment, the method further includes the steps of: (a) processing a request from the recipient to end a conversation between the sender and the recipient, and (b) disabling an option for the sender to reply to or to send another message in a current conversation thread that includes the first message and the first reply in response to the request to end the conversation.

In yet another embodiment, the method further includes the steps of: (i) processing a second message from the sender to the recipient, (ii) crediting a second compensation amount associated with the second message by the sender to a payment recipient specified by the recipient in the communication preferences only when the recipient sends a second reply to the sender, and (iii) delivering the second message to the recipient if and only if all the constraints specified in the communication preferences of the recipient and any constraints applied by the recipient centric messaging system are met by the second message.

In yet another embodiment, the recipient centric messaging system is integrated with an email service to access features of the recipient centric messaging system through the email service.

In yet another embodiment, the method further include the step of notifying the recipient about the first message by sending an email when the recipient receives the first message on the recipient centric messaging system from the sender. In yet another embodiment, the recipient centric messaging system sends one notification for a plurality of emails that are specific to the recipient.

In yet another embodiment, the method further includes the step of providing an option to the recipient to send an email reply to the first message directly from the email service using a reply button that is associated with the email and a protocol. In yet another embodiment, the email reply first goes to an email proxy server and flows through the recipient centric messaging system when the recipient selects the reply button.

In yet another embodiment, the email proxy server receives the email from an email service and parses (a) details of the recipient within the recipient centric messaging system, and (b) a type of message received from the sender. In yet another embodiment, the email proxy server further (a) identifies what message the email is in response to, (b) decides whether any compensation is required to send a reply, and (c) generates an appropriate application programming interface to compose and send the reply to the received email.

In yet another embodiment, the method further includes the step of deleting a message from the recipient centric messaging system in response to a selection of a reject button that is associated with the recipient centric messaging system. In yet another embodiment, the recipient is not credited any compensation attached with the message when the message is rejected.

In another aspect, one or more non-transitory computer readable storage mediums storing one or more sequences of instructions, which when executed by one or more processors, causes communicating at least one message between a sender and a recipient using a communications protocol over a data network through a recipient centric messaging system, by performing the steps of: a) receiving communication preferences specified by the recipient that includes computer interpretable constraints required to be met for delivery of a first message and human interpreted constraints when the recipient creates or updates a profile on the recipient centric messaging system, (ii) publishing the profile with a set of visible preferences from the communication preferences of the recipient that are visible to the sender when the sender selects the recipient to send a message, (iii) processing a request received from the sender to send the first message to the recipient, (iv) generating a customized message form based on the communication preferences of the recipient to enable the sender to compose the first message to comply with the communication preferences, (v) providing an indication to the sender if any of the constraints are not met, and (vi) delivering the first message to the recipient if and only if all the computer interpretable constraints specified in the communication preferences of the recipient and any constraints applied by the recipient centric messaging system are met by the first message.

In one embodiment, the steps further comprise requesting the sender to certify that at least visible preferences out of the human interpreted preferences are satisfied by the message before sending the message. If the recipient reports that the sender has wrongly certified at least one of the visible preferences, the recipient centric messaging system blocks the sender from sending further messages to the recipient, or reduces at least one of (a) a reputation score of the sender, or (b) privileges of the sender. In another embodiment, the privileges include free messages provided to the recipient.

In yet another aspect, a recipient centric messaging system for communicating at least one message between a sender and a recipient using a communications protocol over a data network is provided. The recipient centric messaging system includes (a) a memory, and (b) a set of modules. The memory that stores (i) a database that stores (a) a plurality of communication preferences for the plurality of users, (b) information about the plurality of users, and (c) a plurality of message forms, and (d) monetary details of a sender account and a recipient account. The processor executes the set of modules. The set of modules includes a preferences customization module, a message customization module, a preferences displaying module, a compensation determination module, a constraints applying module, and a compensation providing module. The preferences customization module, which is executed by the processor, specifies communication preferences that include computer interpretable constraints for receiving messages from the sender. The message customization module, which is executed by the processor, automatically generates a customized message form based on the recipient communication preferences to compose a first message. The preferences displaying module that is executed by the processor, displays at least one of the communication preferences of the recipient to the sender in the customized message form. The compensation determination module that is executed by the processor determines the compensation amount to attach with the first message to get attention from the recipient. The constraints applying module that is executed by the processor verifies whether the computer interpretable constraints and human interpreted constraints that are mentioned in the communication preferences are met by the first message to send the first message to the recipient. The compensation providing module that is executed by the processor transfers the compensation amount attached with the first message to the recipient along with the first message when the first message is delivered and when the recipient send a reply to the first message.

In one embodiment, the compensation providing module credits a percentage of the compensation amount for the first message to an account associated with the recipient centric messaging system for facilitating the messaging and for exchange of the compensation amount from the sender to the recipient.

In another embodiment, the compensation providing module provides privileges to the recipient that includes at least one of (a) crediting a compensation amount to a recipient centric messaging system account of the recipient, or (b) providing free messages to the recipient when the recipient invites a new user to the recipient centric messaging system.

In yet another embodiment, the recipient centric messaging system includes a sender verification module that is executed by the processor that verifies the sender when the communication preferences of the recipient require senders to be verified before sending the first message. In yet another embodiment, the sender verification module verifies at least one of (a) a social network account of the sender, (b) an email account of the sender, (c) a phone number of the sender, or (d) personal documents of the sender and does not deliver the first message when the sender is not verified. In yet another embodiment, the recipient specifies that the sender has to be verified for the first message to be delivered.

In yet another embodiment, the recipient centric messaging system includes a combined search module, and a refund module. The combined search module that is executed by the processor, searches for the recipient based on attributes of the plurality of registered users that includes (a) a dynamic location of a user, (b) a name or designation of the user, (c) an age and a gender of the user, (d) current or past companies of the user, (e) industry-segments of the user, or (f) educational institutions of the user to send the message. In yet another embodiment, the communication preferences of the recipient are displayed to the sender when selecting the recipient to send the message.

In yet another embodiment, the refund module provides choices to the recipient to (i) return the compensation money to the sender, (ii) donate part of the compensation money to a charity and keep the remaining money for the recipient, or (iii) donate the compensation money to the charity, or to a newly selected charity for the message. In yet another embodiment, the refund module returns the compensation money to the sender of the first message when the recipient does not provide attention to the first message for a certain passage of time. In yet another embodiment, the refund module automatically donates the compensation money to the charity without the compensation money entering to a recipient centric messaging system account of the recipient.

In yet another embodiment, the recipient centric messaging system includes a message prioritizing module, a mailbox module, and a reputation scoring module. The message prioritizing module that is executed by the processor receives the first message from the sender and prioritizes the first message in the recipient inbox based at least one of (i) whether the sender is known to the recipient, or (ii) the compensation amount attached with the first message. The mailbox module that is executed by the processor manages the messages received from different recipients. The mailbox module determines a current placement of the first message in an inbox of the recipient based on the compensation amounts associated with other messages in the inbox.

The mailbox module may (a) determine a cumulative value of compensation amounts associated with the messages in the inbox, (b) display the cumulative value of the compensation amounts associated with the messages in the inbox of the recipient, (c) display each of the messages in the inbox of the recipient along with the compensation amounts attached with each of the messages, and (d) sort the messages in decreased order of the compensation amount associated with the messages. The reputation scoring module that is executed by the processor may determine a reputation score for the sender based on feedback from the recipient on at least one of (i) a priority level of the first message, (ii) whether the first message is properly classified by the sender, or (iii) whether the message is offensive or inappropriate to the recipient.

The reputation scoring module may further determine the reputation score for the sender based on an analysis of a message history of the sender using predefined rules based on at least one of a (a) number of messages sent by the sender to the recipient, (b) fraction or percentage of messages marked as irrelevant messages by the recipient, and (c) fraction or percentage of messages replied to by the recipient.

In yet another embodiment, the reputation scoring module further determines the reputation score for the sender using a machine learning algorithm which analyzes a plurality of parameters selected from a group consisting of a (a) number of messages sent by the sender to one or more recipients, (b) fraction or percentage of messages replied to by the one or more recipients, (c) relevance ratings assigned to the messages by the one or more recipients, (d) length of replies sent by the recipient, or (e) sentiment analysis of the messages.

In yet another embodiment, the recipient centric messaging system includes a set of application programming interfaces and a protocol that specifies how the sender can send the messages and how the recipient can receive the messages over the recipient centric messaging system. The protocol includes specific requirements for honoring the communications preferences. The recipient centric messaging system displays the communications preferences of the recipient and enforces the sender to comply with the communications preferences in the application programming interface when the sender selects the recipient to send the message.

BRIEF DESCRIPTION OF THE DRAWINGS

The embodiments herein will be better understood from the following detailed description with reference to the drawings, in which:

FIGS. 4A-4B illustrates user interface views of creating or updating a recipient profile based on social network accounts according to an embodiment herein;

Figure 5A:
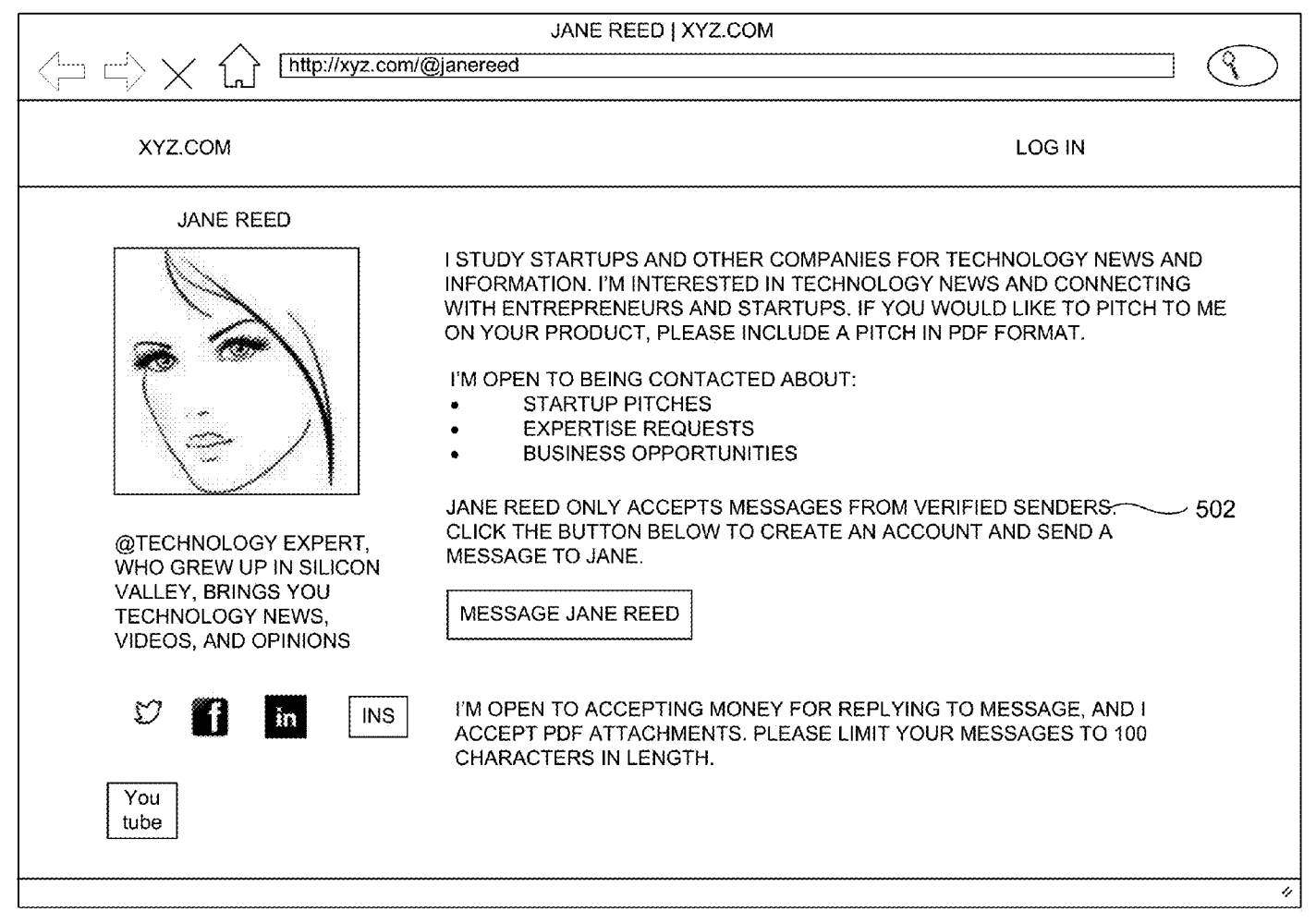

FIGS. 5A-5B illustrate user interface views of a recipient profile with a list of visible recipient preferences made visible to a sender and options to contact the sender according to an embodiment herein;

FIGS. 14A and 14B illustrate user interface views of the recipient centric messaging system of FIG. 1 used for determining a reputation score for the sender based on feedback from a recipient according to an embodiment herein;

DETAILED DESCRIPTION OF PREFERRED EMBODIMENTS

Figure 1:
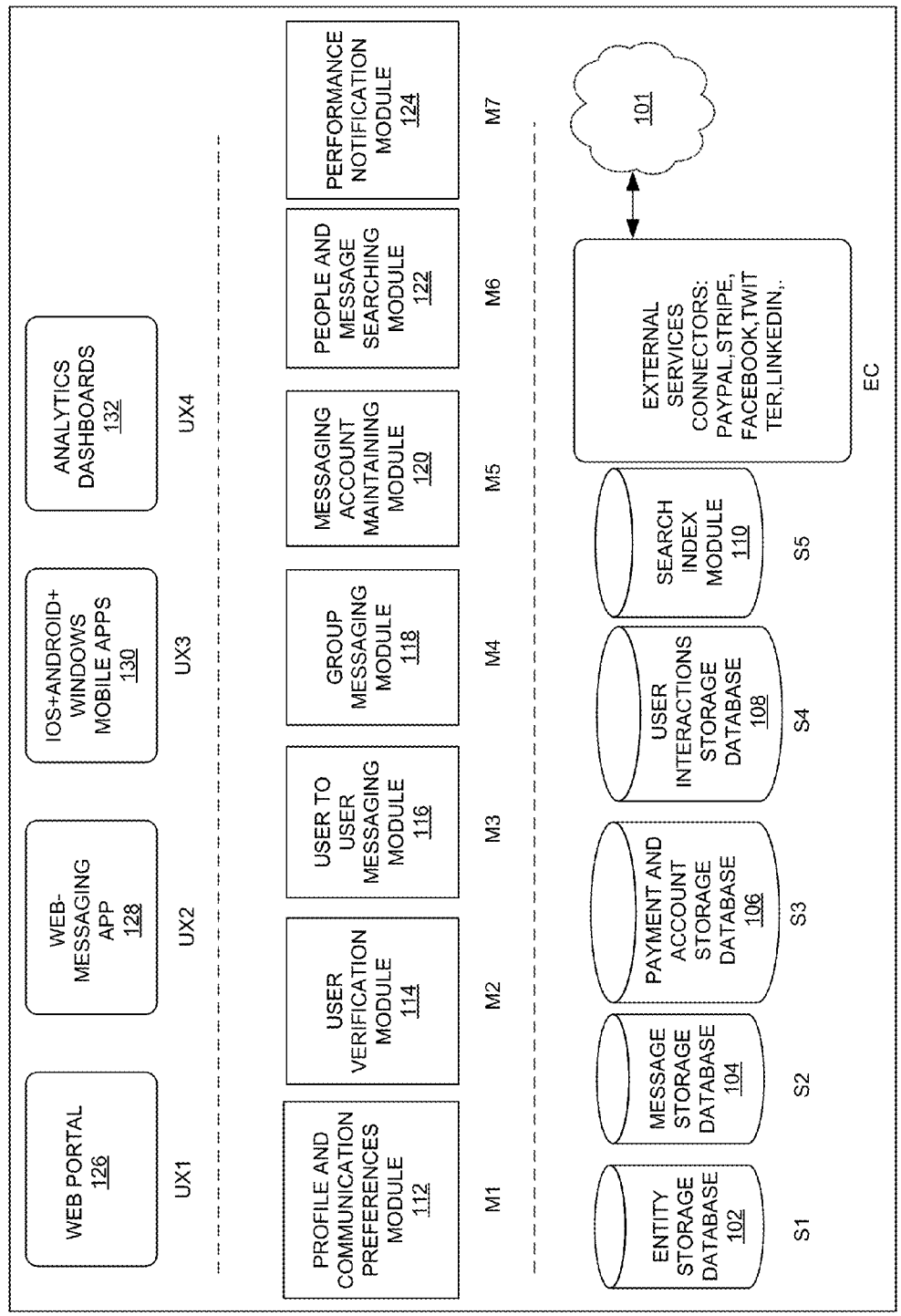
FIG. 1 illustrates modules, databases, and user experience components in a recipient centric messaging system that communicate with external services through a network according to an embodiment herein.

The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Descriptions of well-known components and processing techniques are omitted so as to not unnecessarily obscure the embodiments herein. As mentioned, there remains a need for a messaging system that is not sender centric and that provides more control to recipients directly. The embodiments herein disclose a recipient centric messaging system and protocols used to implement the recipient centric messaging system over data networks. The recipient can specify his/her communication preferences, and the messaging system would require that the sender meet these requirements for the message to be delivered to the recipient's inbox. The recipient specifies the communication preferences that include computer interpretable constraints when the recipient creates or updates a profile on the recipient centric messaging system. The computer interpretable constraints may include (i) a limit on a number of characters in the message, (ii) a specification on whether images or attachments are allowed or not, (iii) a compensation amount that is required for delivery of the message, (iv) a threshold reputation score of the sender required for delivery of the message, or (v) a volume of message traffic received by the recipient that are associated with a category of communication selected from the different categories of communications. Some requirements are automatically verified by the system, but some of the requirements could be soft requirements that can't be verified by the system. An example of a soft requirement is that the senders certify that they have met the recipient in person. In this case, the system relies on a reputation management solution to keep cheating to a minimum. In another example, the messaging system requests the sender to certify that the visible preferences are satisfied by the message before sending the message. If the recipient reports that the sender has wrongly certified the visible preferences, the messaging system may reduce privileges of the sender (e.g. reduce the free messages provided to the recipient). The messaging system may be sufficiently flexible and adaptable so that it may serve a variety of communities.

In one embodiment, the recipient centric messaging system allows a limited number of free messages within a given time period if the sender and the recipient (a) share the same alma mater, or (b) the sender and the recipient previously worked for the same employer.

The embodiments disclose a recipient centric messaging system that can enforce recipient constraints around their preferences, and provide compensation for their attention and/or the ability to share their communication address freely without fear of spam and inappropriate content. The recipient centric messaging may be optimized to allow people to communicate effectively with people outside of their social and/or professional networks. The recipient centric messaging system allows a user to have a public communication address that anyone can use to contact them. It may also give the recipient controls to manage communication in a way that filters out spam and irrelevant messages while also optionally providing for an option for the sender to compensate them for their attention.

As mentioned, many communications systems today are "sender-centric" in that there is little additional burden put on the sender once they have obtained the recipients address (e.g. email address, phone # for SMS, etc.). When they send a message, the message is automatically delivered to the recipient's inbox. It may then be up to the recipient to look at all received messages and make a decision to respond or delete as "junk-mail" or up to the messaging service to automatically determine they are likely to be spam and put them in a special folder in the recipient's inbox. The recipient centric messaging system is designed to be a "recipient-centric" system from the ground up.

The recipient centric messaging system may include a 1-1 messaging system, and/or a group messaging system. It may further include a 1-many messaging systems for managing sponsored communications. The sponsored communication is a direct connecting marketplace between buyers and sellers of attention. The sponsored message with a minimum compensation amount to deliver the message to the buyer.

The sponsored message may include (a) a promotional content, (b) an advertisement, (c) a video associated with advertisement or promotion, etc. The messaging system provides a searchable public directory (e.g., profile store) of all users who have signed up with the service and the users may send or receive messages. The system may require users to verify themselves using a variety of methods (e.g. email, phone #, credit card, associating to other social media accounts they own, etc.) so that everybody on the system can have high confidence that they are messaging with the "said" individual versus someone else who might have set-up a similar fake profile and might be an imposter. The system provides an address-handle (e.g.xyz.com/@janereed) that can be showcased on any public website, a LinkedIn profile, blogs, etc. so that interested senders may communicate with registered users. The messaging system may also provide a small graphics-icon that can be shared freely and posted on various websites.

As part of signing-up for the messaging system service, users specify and/or set-up their communications preferences for receiving messages. The users may indicate the topics they are interested in, whether they allow images/attachments to be sent or not (e.g. which is highly relevant to women recipients when getting messages from people they do not know), size limits, and whether any amount of money is paid with the message to compensate the recipient for his attention and time. Often the money sent may be minimal, but even small amounts can greatly discourage senders of spam and inappropriate messages. For more persistent spammers the system also allows for blacklisting senders. The recipient's communication preferences may optionally be specified as a logic formula with "AND", "OR", "NOT" clauses among the possible constraints allowed by the system.

For the sender to send a message, they may simply click on the messaging system address-handle for the recipient. The senders are taken to set of screens that show recipient preferences and a structured message-form that facilitates the senders to meet those requirements. If the recipient has asked for monetary compensation, then the sender needs to first add some money to their account with the messaging system using a credit card or service such as PayPal or Stripe, and then attach the requested sum with the message. The compensation to be attached to the message may be dynamically determined by system. The sender may also need to solve a Captcha code (e.g. to prove they are human and not a machine sending bulk messages) or any satisfy other such requirements specified by the messaging system. Once the sender meets all requirements specified by recipient, the sender can send the message, which will then be delivered to the recipient.

The recipient centric messaging system will also provide the ability to users to specify categories of messages that they would be interested in receiving. Examples of such categories are personal messages, requests for speaking engagements, requests for book reviews, requests to review a business plan, career advice etc. The recipient centric messaging system will make it easy for the sender to indicate the category of the message. Some of the categories are suggested by the system, and some are created by the recipient. Categories allow for the recipient centric messaging system to add filters to categorize the mail that is received, and also to select different payment options for different categories. For example, a recipient might want money when someone wants them to review a business plan, but they might be open to giving career advice for free or to receive a message from someone that knows them. The recipient centric messaging system will let the recipient create custom categories, and set different payment options for each category. The categories of communications may set up by the recipient based on (a) properties of senders, or (b) properties of communicated content. The recipient may specify different constraints for different categories of communications.

Some of the recipient's preferences can be enforced by the messaging system no attachments), but some of them are soft-preferences. (e.g., someone stating that they know the recipient even though they don't, or selecting a message category of career advice). In those cases, the system may provide a feedback mechanism where the recipient can rate the sender (for example, mark their message as spam). This lets the system take appropriate action (like block future messages from them). The preferences for each user may be stored as rules in the database, and every client that can compose messages (e.g., using web, mobile web, iOS app, Android app or any client that uses the system APIs) retrieves these constraints and enforces them at the time of message creation. The specific user experience used may depend on the device, Operating system etc. The recipient centric messaging system includes a set of API's and a specific protocol for how a client can send/receive messages over the system. These protocols are unique because of the specific requirements around honoring recipient preferences. The system may be a closed system so that only clients that use the system API are allowed to participate in the messaging system. This allows the system to make guarantees on honoring recipient preferences.

The recipient is now assured that the messages in their inbox are much more likely to be relevant messages that will add value and are likely to be worth responding to. The recipient may easily respond to the message, in which case they will be credited with the money, if money was associated with the message. The messaging system may provide considerable flexibility on how money is handled, since there may be many regulatory or ethical requirements to taking money when people message you. The messaging system may also make it easy for recipients to return money to senders when or where appropriate, or give some or all of money to charity of their choice etc. Also, if the receiver chooses not to respond to a sent message (e.g., for various reasons), at some threshold time the messaging system will return the attached money to the sender's account.

The proposed messaging system provides unprecedented control to recipient of messages not found in other messaging systems. For example, the recipient can decide if they are open to receiving anonymous messages. In particular, this is a desirable property for investigative reporters where they are open to receiving anonymous tips for their stories, though most people may not find this feature attractive.

While there are numerous existing and emerging messaging systems and Social networks and Blogs, in many ways email remains the most important place where you get notifications. For example, there may be an email sent by Facebook to a user to indicate that somebody tagged him/her on a picture, or that somebody made a "connect" request on LinkedIn or sent you a message on LinkedIn, or somebody tweeted to you on Twitter, and so on. This is doubly ensured that everyone continuously monitors their email to learn about messages arriving on other communication channels.

The recipient centric messaging system is integrated with email so that some subsets of the features of the recipient centric messaging system can be accessed through email. When the recipient receives a message from the sender, the recipient centric messaging system may notify the recipient about the message by sending an email. The notification system can be intelligent in the sense that it doesn't need to send a notification for every email, but can send one notification for several emails and can also send a digest of new notifications to make it easy for the recipient to reply to specific messages. The recipient centric messaging system may provide a unique communication address that is optimized to receive messages from people/senders you don't know and could have additional features to help with such messages.

The recipient centric messaging system includes features that could help with potentially introducing some recipient preferences in a non-automatic way. For example, when the sender sends an email/message to the unique communication address of the recipient centric messaging system, the sender receives an auto-reply with a survey about what the email/message is about (e.g., personal, business etc.) with links to click for each choice. This helps the sender classify the message for the recipient and also confirms that there is a real person sending the email with a valid email address (since they have to verify the email). A notification may be sent to the email along with the message but it may not have all the other features available to messages sent to the recipient centric messaging system (e.g., like compensation amount).

The messaging system may be integrated with email in the following ways: (i) when a message arrives for the user from the messaging system, the summary of the content, or the full message if it is just text is sent to the user via email. The email includes a special "Reply" button embedded inside it. While selecting the "reply" button, the system may directly take you to that message within the system messaging client (e.g., web-client on PCs or mobile client on iOS and Android) for the user/recipient to compose and send the reply. However the reply message is stored in the recipient centric messaging system 100, and not in an email client; (ii) For messages that are text-only and where no-special action/restrictions are applicable for the reply (e.g. as in survey messages entering a special "completion code", or that have reply length constraints, and so on, the messaging system may provide an option so that the user can reply to the message directly from an email client using the email client reply button and protocol. In this case the email reply may go to a proxy-server and then flow through the messaging system (e.g., so that all sender and recipient preferences/constraints are respected), so that any attached money is properly accounted for.

However, the messaging system simplifies the user's task of frequently switching between multiple messaging clients and interfaces; (iii) Beyond the "reply" button, the messaging system may also include other "action" buttons. The messaging system might optionally provide a "Reject" button. The reject button can be used to delete the message from the messaging system and make sure that the recipient is not credited any attached money as he made the decision not to reply (pay attention) to the message; and (iv) the messaging system may also provide daily or weekly digests of activity or pending requests as email notifications to user. This integration can help user to manage their flow of messages coming from the messaging system and ignore some of them during periods when the traffic over the messaging system network is high.

Some of the above exemplar integrations can be implemented through an email-system proxy service. For the messaging system to email pathways, the proxy-service translates the system messages into email and sends them to an appropriate user's one or more registered email address(es). For example, the messaging system may decide (i) what summary to extract from the original system message, (ii) what other HTML-buttons to add to the email message, and (iii) what email address to send such composed messages to. In one embodiment, on the reverse pathway, the proxy-server may receive the email from an email-service, parse the recipient within the messaging system, parse the type of message, what message this is in response to, decide if any money transfers are required and then invoke the appropriate messaging system APIs so that from an end-user perspective it appears that the message-reply was composed and generated within the messaging system.

Further the messaging system may determine and maintain a reputation score for each the sender/recipient in the system to be able to report senders who are frequent spammers and have an idea of responsive recipients. In one embodiment, the messaging system may report the spammy senders, and the responsive recipients based on (i) what kind of message the sender sends to the recipients, and (ii) how much time the recipient takes to respond to the sender's message. In addition, the recipient centric messaging system may use the reputation score to decide if messages from the sender can be sent to the recipient. It may also allow the recipient to specify that they only accept messages if the sender has a score greater than a threshold reputation score. The reputation score may be calculated based on (i) analyzing a message history to identify a (a) number of messages sent by the sender, (b) number of messages marked by the recipient as irrelevant messages (e.g. spam), and/or (c) a number of replies sent by the recipient. The message history may be analyzed by predefined rules, (ii) various parameters that include a (a) number of messages sent by the sender, (b) number of replies sent by the recipient, (c) text contained in the messages, (d) length of the replies sent by the recipient, (e) time of a day (e.g. 11 PM) the message was sent, (f) language used in the message, various parameters analyzed by a machine learning algorithm, and/or (iii) sentiment analysis of the messages. The reputation score may be used to incentivize or encourage the sender to send relevant messages to the recipients and to discourage irrelevant or inappropriate messages.

The messages may be ranked in the recipient inbox based on the reputation score and the compensation money attached with the messages. The messaging system may allow the sender to send only paid messages (e.g. messages with an attached compensation amount) if the sender has a low reputation score. The messaging system may show the reputation score of the recipient to the sender, if the recipient has the high reputation score.

In one embodiment, another desirable property for the recipient centric messaging system is its ability to unify the numerous siloed messaging systems that users have today (e.g. one to manage their messaging presence on Quora, another on Yelp, another on Reddit, etc.). This is because each of the above mentioned community sites builds in own custom messaging system to address the failures of email and alternative messaging systems, but not in a broad general way as proposed here. But, the recipient centric messaging system 100 has ability to capture the webpage address on which the messaging system address-handle is placed (for example, it will know whether the invocation of xyz.com/@janereed was from a Quora web page or from a Yelp web page). Based on this knowledge, the recipient centric messaging system may automatically tag/label the message that is sent with domain-name of invoking site. This may allow the Inbox client to automatically separate out messages received from different communities, making it easy for recipient to reply respecting the expected norms of the community, in an embodiment.

This is one exemplar of various dynamic labels that may be attached to messages based on context and environment (e.g. another could be country of origin) that can be used in message filtering algorithms for the recipient. The system mailbox may indicate how many messages there are, how much money is associated with the messages, and with some indicator of the time required as well. Since the system has profiles for every sender in the system, the mailbox can have a people centric view, which shows profiles of the different senders and the amount of mail from each. There are also other visualization options where one can see charts of your mail by source, category etc.

The messaging system may also support 1-many messages. The 1-many messages option is most useful for group informational messages (e.g. messaging all small-business-owners in a mall about a change in parking regulations), or as a marketing tool (e.g. messaging all restaurant-owners in a zip-code about a new coffee-machine that has just been introduced). However, the messaging system ensures that the senders of such messages meet recipient preferences, which may include enabling recipients to be compensated for their time and attention based on their preferences.

The recipient centric messaging system may include a target list generation module, an attention criteria specifying module, a compensation determination module, a klout score determination module, a communication preferences verification module, an attention criteria verification module, and a compensation crediting module. The target list generation module is configured to generate a target list of a subset of registered users of the recipient based messaging system by searching or selecting the subset of registered users by the sender based on a plurality of desired attributes. In an embodiment, the desired attributes includes a (i) registered or dynamic location of a plurality of users, (ii) profession of the plurality of users, (iii) age and gender of the plurality of users, and/or (iii) identity of the plurality of users. The plurality of users may be verified based on (a) a verified phone number, a verified credit card number, or a verified social media (e.g. LinkedIn) profile.

The attention criteria specifying module is configured to specify the attention criteria required from the plurality of recipients for receiving the compensation for providing attention to the sponsored message. The attention criteria may include (a) whether the sponsored message was opened or not, (b) a minimum amount of time needs to be spend by the recipient where a sponsored message window forefront and visible to the recipient who received the sponsored message, (c) whether the recipient interacted with the sponsored message window by scrolling down to latter portion of the sponsored message, (iv) whether the recipient sufficiently watched a video or not when the video is attached with the sponsored message, (v) hot spot overlays on a video, or that an, image needs to be touched, or clicked to indicate attention when the video, or the image is attached with the sponsored message, (vi) whether a short survey at end of the sponsored message is answered by the recipient, (vii) an explicit button needs to be acknowledged that the sponsored message is read by the recipient, and/or (viii) a time boundary by when attention needs to be provided to the sponsored message.

The compensation determination module is configured to determine the compensation amount to attach with the sponsored message to get attention from the recipient. In an embodiment, the sponsored message requires a minimum compensation amount to be delivered to the recipient. The compensation determination module associates the compensation with the sponsored message. The compensation determination module may provide a fixed compensation amount to the registered users in the target list. The compensation determination module may alternatively provide a variable compensation amount to the registered users in the target list based on criteria selected from a group that includes: (a) importance and popularity of the plurality of recipients, (b) a minimum compensation amount that the registered users has set to receive the sponsored message, (c) algorithmic recommendations by the recipient centric messaging system based on length of the sponsored message, and (d) historical data indicating which compensation drives what percentage of open-rates for the sponsored messages.

The klout score determination module is configured to determine a social popularity score and/or a reputation score for the registered users. The communication preferences verification module is configured to verify whether the sponsored message complies with the communication preferences of the registered users from the target list of the subset of registered users. The communication preferences may include constraints and communication preferences specific to the sponsored messages. The communication preferences verification module delivers the sponsored message only to those registered users from the target list of the subset of registered users for whom the sponsored message complies with their communication preferences.

The attention criteria verification module is configured to verify whether the recipient meets one ore more of the attention criteria to get the compensation amount attached with sponsored message. The compensation crediting module is configured to credit the compensation only to those registered users from the target list of the subset of registered users for whom the sponsored message complies with their communication preferences including the mandatory constraints and the communication preferences specific to sponsored messages only when they provide attention to the sponsored message that meets the attention criteria specified by the sender.

The recipient centric messaging system allows the recipient to specify the communication preferences to receive the sponsored message. The communication preferences may include (i) whether the registered recipient wishes to receive the sponsored messages from all senders or not, (ii) an interested topic that the recipient is open to receive the sponsored message on, (iii) whether the recipient is open to receive the sponsored message from black-listed senders or not, (iv) a specification on whether images are allowed or not and whether attachments allowed or not, and/or (v) a compensation amount that is required for delivery of the sponsored message.

The sponsored messages are displayed under a sponsored message tab that is associated with a mailbox of the recipient centric messaging system. The unclaimed compensation amount may also be displayed in the sponsored message tab. Further, the recipient centric messaging system may indicate (a) list of the sponsored messages along with the compensation amount which is already claimed by the recipient, and (b) unread sponsored messages with their compensation amounts.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. As used in the below description, the terms "database/store", "module", "user-experience (ux)", "system", and the like are intended to refer to a computer-related entity, either hardware, a combination of hardware and software, software, or software in execution. For example, a database/store/module may be, but is not limited to being, a process running on a processor, an object, an executable, a thread of execution, a program, and/or a computer. By way of illustration, both an application running on a server and the server can be a database/module. One or more databases/modules may reside within a process and/or thread of execution and a module may be localized on one computer and/or distributed between two or more computers that may be localized in same data center or geographically distributed.

Referring now to the drawings, and more particularly to FIGS. 1 through 17, where similar reference characters denote corresponding features consistently throughout the figures, preferred embodiments are shown. Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

FIG. 1 illustrates modules, databases, and user experience components in a recipient centric messaging system 100 that communicates with external services through a network 101 according to an embodiment herein. The recipient centric messaging system 100 includes the various databases and modules and user-experience components that come together to implement the messaging system. In one embodiment, the various systems include additional databases or modules and/or may not include all of the components and modules discussed in connection with the figures. A combination of these approaches may also be used. The various aspects disclosed herein can be performed on electrical devices including devices that utilize touch screen display technologies and/or mouse-and-keyboard type interfaces, in an embodiment. Examples of such devices include computers (desktop and mobile), smart phones, personal digital assistants (PDAs), and other electronic devices both wired and wireless.

The recipient centric messaging system 100 includes databases such an entity storage database 102, a message storage database 104, a payment and account storage database 106, a user interactions storage database 108, modules such as a search index module 110, a profile and communication preferences module 112, a user verification module 114, a user to user messaging module 116, a group messaging module 118, a messaging account maintaining module/payment module 120, a people and message searching module 122, a performance notification module 124, and user experience components such as a web portal 126, a web-messaging app 128, iOS, Android, or Windows mobile apps 130, and analytics dashboards 132.

The entity storage database (S1)102 may store information about "users/people" but also about other possible entities, such as businesses or groups that could be both senders and receivers of communications. For people and entities, the entity storage database (S1)102 may store information such as a name, an address, a picture, email-addresses, a phone no, a date-of-birth, a driver license number and images, a background-picture for a profile page, education history, employment history, links to the person or entity's social networks (e.g. on Facebook, LinkedIn, Twitter, Quora, Pinterest, Stack Overflow, Medium, etc.), endorsements from other people, Credit Cards/PayPal-accounts/Bank-account links as may be required to receive and send payments within messages, etc. Not all of the fields may be filled out at any given point in time. Other fields may be added at any time to capture more data that is relevant for the communications task. In cases of business/group entities, similar but slightly different fields may be recorded (e.g. the business email address versus the individual/personal email address).

The recipient centric messaging system 100 may encourage users to "verify" several of the above fields using a variety of methods, in an embodiment. For example, sending an email to the specified account and getting a response back may verify an email address. Sending a code via SMS to that phone and receiving a response code back may verify the mobile phone number. The mobile phone verification is an important part of the system since new SIMs for mobile phones are hard to obtain, and the messaging system may limit the maximum number of accounts/user-profiles that can be associated with any single phone number. Similarly, a recipient may verify that the links being provided for various social accounts such as Facebook, Twitter, and LinkedIn are genuine by asking the user to login and authenticate against those systems. The verification is important so that everybody on the recipient centric messaging system 100 can have high confidence that they are messaging with the "said" individual versus someone else who might have set-up a similar fake profile and might be an imposter. The user verification module 114 may provide the logic and services to implement all these verification procedures.

The entity storage database (S1) 102 is also used for storing the "communications preferences" for the person/entity. In an embodiment, the recipient centric messaging system 100 is capable of supporting a wide variety of options for what is recorded and how these get leveraged. In another embodiment, the communications preferences may include but are not limited to and may be selected from any of: 1) a simple text-field indicating areas of interests, what ought to be included in the message, who they wish to connect with and for what purposes, etc.; 2) a limit of characters or words of text that could be in message; 3) a specification of whether images are allowed or not; 4) a specification on whether attachments are allowed, file-types of attachments allowed, size-limits on attachments allowed, what attachments are must-have, etc.; 5) an ability to black-list people/entities on the messaging systemdatabase (i.e. the entity storage database (S1) 102) and preventing those from sending the recipient messages; 6) an ability to white-list people who may have become trusted associates and are therefore allowed to send messages without any constraints above; 7) an ability to require that the senders must-have certain "verified" attributes before sending messages (e.g. they have a verified phone number and verified LinkedIn profile link); 8) an ability to black-list certain specific words (e.g. various four-letter words) and ensure that messages containing those are not accepted, and/or simply checking a box that leverages the messaging system specified defaults for such words and image filtering; 9) an ability to specify that before sending a message the sender much prove they are human (e.g. done via a captcha code that asks the person to enter the number contained in a distorted image or through variety of other means that are common practice now); 10) an ability to specify the amount (e.g., could also be $0) that the sender must attach before sending the message to ensure seriousness and/or as compensation for the time/attention of recipient; further this amount may be specified as a minimum reserve price that could be exceeded by sender, or as a dynamic price determined by the messaging systemto increase the priority/visibility of sender messages using any of auction or other algorithms; 11) an ability to specify different categories of communication that allows the recipient to quickly prioritize which messages to pay attention to. These categories also allow for different compensation amounts for different classes of messages, for e.g. personal messages do not require any money attached, but sponsored/marketing messages must include at minimum $2; 12) the compensation amounts may not always be monetary as just indicated; they could also be arbitrary other virtual points/goods as often use in gaming systems or search competitions; 13) a check-box list with ontology of different categories of industries, different categories of inquiries, etc. that the user can simply check to indicate her interests; the sender could then also checkmark what areas his/her message corresponds to; 14) an ability to specify that messages only be accepted from senders who have a certain reputation within the system (e.g. if their messages are not rejected or marked as spam/inappropriate by xx % of recipients), or that they are considered an authority on a topic of interest, or they have a certain "star-rating" on the messaging system, or they are well-recognized on a connected system (e.g. they are a "top-writer" within the Quora community or they are a "verified user" on the Facebook or Twitter communities); 15) an ability to specify that the sender is "friends" or "connected" with recipients (the user) own friends/community, e.g. they are less than 2-degrees of separation from the recipient; 16) an ability to require driver-license verification and checks against various state and national databases.

In an embodiment, entity storage database (S1) 102 contains not-only static information, but it also records certain dynamically generated information by the recipient centric messaging system 100. For example, reputation scores, a success rate in sending messages and % that were "accepted" by recipients, and etc. The recipient centric messaging system 100 may at any time support only a subset of the preferences listed above and/or new ones may be added later as needed. The reason to support an extensive set of controls via these preferences is that the common-case scenario for the messaging system is for messaging with people/entities that you do not know well. In one embodiment, the senders do not belong to your social/professional networks (at least, yet), and therefore one may wish to take a conservative approach to minimize spam/inappropriate messages and the interruption/attention/time that such messages may take from the user. The degree of verification a recipient wishes/specifies may also be a function of the criticality/risk associated with the message. In one embodiment, the sender needs to verify themselves in many ways, for example, this may increase chances that the recipients trust them and accept their messages.

In one embodiment, this profile-information and these communications-preferences may be captured using the logic/code contained in the profile and communication preferences module (M1) 112. The profile and communication preferences module 112 implements the logic to enlist this information from the user and keeps profile-information and communications-preferences up-to-date in the entity storage database (S1) 102. From time-to-time, based on the completeness of the profile, in conjunction with the performance notification module (M7) 124, it may also send reminder messages encouraging them to further complete/update the profile information stored for them. This information may be updated by users via the web-portal (UX1) 126, the web-messaging app (UX2)128, or mobile apps (UX3) 130.

In one embodiment, all of the information about a user (e.g., both their profile information and their communications preferences information) is divided into two parts (i) a "visible" part and a (b) "hidden" part. The "visible" part, e.g. name, photos, topics of interest to user, etc. are those fields that are shown to other users and entities to help them discover the "said" person/user and to communicate more effectively with them. The "hidden" part, e.g. credit-card info, black-list of people for this user, etc. are those fields that are not shown to other users, as they may be relevant only to the internal workings of the messaging system (e.g. credit-card info), and/or they may potentially hurt relationship and communications within the community (e.g. the black-list information). In one embodiment, the messaging system will have default classifications for the various kinds of information we obtain from users, but we will also provide some user-control in deciding what is exposed externally (e.g. some may prefer not to have their image shown).

The message storage database (S2) 104 may include all data associated with the actual messaging among users. The user to user messaging module (M3) 116 implements all the logic associated with actual sending and receipt of messages, for verifying that the recipient requirements are being satisfied, ensuring that the payments are made and received when they are required or offered as incentive (e.g., in conjunction with payments store and module), and other elements that are specified below. The user-interface for all these functions is provided via the UX1-UX4 (a web portal 126, a web messaging app 128, an iOS/Android/Windows mobile app 130, and analytics dashboard 132) components across web and mobile apps.

The message storage database 104 may contain all sent and received messages for users and entities. In one embodiment, the message storage database 104 contains the contents of the message (e.g., text, images, attachments, etc.), the threading relationship between the messages (e.g. what is a reply to what message), metadata such as what messages have been read/unread, how much time has elapsed since a message was sent and the read/unread status (e.g. in which case it may be useful to return money to the sender if there is no attention by recipient), and numerous other parameters as normally found in implementations of such email/messaging systems. The message storage database 104, itself may be partitioned across servers and data centers (e.g., including geographical distribution for performance, for redundancy and data protection) and/or for meeting national PII-data storage (e.g., personally identifiable information) requirements (e.g. that data for citizens of China must be stored only on servers located in China).

The message-store component of the recipient centric messaging system 100 may be similar to other public email/messaging systems. However, the recipient centric messaging system 100 includes certain unique kinds of data that are allowed in the structured messages (e.g. as specified by recipient preferences) and in how the user-to-user messaging module (M3)116 then operates on the data store to implement the allowable user message exchanges. In one embodiment, the above section focuses only on 1-1 message exchanges between users of the messaging system.

As discussed earlier, the recipient centric messaging system 100 may include a provision for senders of messages to attach payments (using real or virtual currencies) to messages for recipients in lieu of their (i) time and attention, (ii)

for their advice and expertise, (iii) to indicate their own serious intent in sending the message, (iv) to increase the priority of their message in the recipient's view, (v) to increase the likelihood that the recipient will provide a more thoughtful and detailed reply based on the principle of human-reciprocity, and/or (vi) simply as a mechanism for recipient to discourage sexually or otherwise inappropriate messages to be sent to her.

For any given message with attached payments, the recipient is provided with a variety of ways to deal with the money as shown by few exemplars below. For example, the recipient could: (a) return the money to the sender (e.g., because they happen to be an old long-lost friend), (b) or donate it all to a given charity or in specified proportions to a set of charities, (c) or keep it all for herself, and (d) or keep x % for herself and donate (100−x) % to one or more charities. When the system is directed to donate 100% to one or more charities, the recipient centric messaging system 100 may do so in a way so that there are no tax consequences for the recipient (e.g., no money flows to her, and all is given to charity by the recipient centric messaging system 100 in an anonymous manner), and/or the money could be first directed to the recipient account and then portion of money directed to charity with the recipient-name attached. The recipient centric messaging system 100 also may provide options such that when a recipient is unable to provide attention to a message, (e.g. it has been pending in their Inbox for more than 7 days), the attached money may be refunded to the sender of the message.

As envisioned, in a preferred embodiment, the recipient centric messaging system 100 may not store "real" money in the accounts associated with users and entities. To pay for sending a message, users must first "fund" their recipient centric messaging system 100-account via $3^{rd}$ party services such as PayPal, Stripe, or Bank account. In an embodiment, the balance in such user-accounts goes up or down based on payments made or received for messages or returned from unattended messages. However, when the messaging-account is "funded" using external services, or when money is taken out of the messaging system user-account to an external bank/PayPal account, etc., then the system may impose a certain minimum-amount that must be transferred (e.g. system could have a $5 minimum for adding or removing funds). The $5 minimum may be required to limit the total no of bank/PayPal/Stripe/transactions required, as typically today, such transactions come with an overhead of 2.9%+30 c charge in the US. In one embodiment, the fund details of the user account are stored in the payment and account storage database 106.

To support the above scenarios, the messaging account maintaining module/payment module 120 in combination, may maintain a messaging-account for all users and entities in the recipient centric messaging system 100. In one embodiment, all transactions are duly recorded and an audit-trail is kept. In another embodiment, the recipient centric messaging system 100 attempts to make sure all transactions comply with necessary local, state, national, regulations and guidelines. For example, the system may issue a 1099-MISC form in USA as record submitted for income received by a recipient through such messages. The system may also attempt to perform additional processing, such as fraud detection, money laundering, etc. The recipient centric messaging system 100 may perform some of such processing itself or rely on interfaces to $3^{rd}$ party systems/services for the implementation of such hygiene and regulatory matters. The recipient centric messaging system 100 also envisions providing informal guidance to all users on ethical-use and best practices use of money within the system.

The messaging account maintaining module/payment module 120 (e.g., working in close conjunction with the messaging module) may also implement an algorithmic recommended/auction pricing logic for messages to support senders. This recommendation-system may recommend how much money the sender may want to attach to the message to get recipient's attention immediately by being the top-message (e.g., or be in the top-10 unread messages, or based on what other pending messages have paid, or based on other digital auction-logic) and is a hint that the senders can leverage. The recommendation service is also useful because often the recipients may be hesitant/shy/not-know-how-to-best-estimate putting a monetary value to their time or attention, but feel much more comfortable when the recipient centric messaging system 100 is itself doing such price setting or recommendations.

In one embodiment, the recipient communication preferences may be specified to include that certain money is to digitally accompany the message for required conditions to be satisfied. In this case the money specified is an "exact" amount to be delivered with the message. In another embodiment, the money specified may be a "reserve price" (e.g., the minimum amount to be attached), but a higher amount may also be attached to seek attention. In another embodiment, the money is not specified directly by the recipient, but the recipient chooses that the system run an algorithm (e.g., which may be an auction) to determine how much money the sender ought to attach to increase priority of the message for the recipient. The money may be a virtual currency as used often in digital gaming systems (e.g. points, virtual goods). The money allocated to user may be a dynamic amount based on properties of the content (e.g. length of attached video) so that the monetary amount is a function of the amount of recipient attention required.

When such 1-many marketing messages are flowing through to a selected group of users, the messaging account maintaining module 120 helps in deciding how much needs to be paid to each group member (e.g. fixed amount to all or variable amount based on user profile) and does the needed accounting to support the system. The messaging account maintaining module 120 may also collect a "vig" or a commission associated with all monetary transactions flowing through the recipient centric messaging system 100 for both regular and sponsored messages.

The recipient centric messaging system 100 may support searches based on (i) a people search and (ii) a message search. The people search may further includes two types of scenarios as follows: (a) looking for an individual person, and (b) when we are looking for a group of people (e.g. to send a sponsored message) that share some characteristics. In one embodiment, the searches are performed in the people and message searching module 122.

By default, all user profile data, both structured (e.g. date of birth, name of university, years when attended college, name of major, etc.) and free-form text (e.g. what I fill out within the "interests" field) are fully indexed within the recipient centric messaging system 100 (i.e. in the search index module 110). In one embodiment, the search interface provided for individual and group search is a combination of "full-text search" and "faceted search" (e.g., as in the search interface provided in the LinkedIn and Microsoft Outlook systems). The full-text search is used to filter the individual/entities based on any of the text-fields in user profile, while faceted search takes advantage of known entities (e.g. location/cities, current or past companies, industry-segments, educational institutions, etc.) to narrow down the scope of search. Such an interface can leverage the sparse knowledge the user may know about the person (e.g. they live in city X, or they went to university Y, or I used to work with them at company Z, to narrow the search quickly). These are common techniques used in numerous systems deployed in industry and academia, as known to persons skilled in the art.

In one embodiment, all of the messages in the recipient centric messaging system 100 are also full-text indexed and associated meta-data is also indexed (e.g. who sent the message, were there any attachments, date sent, etc.) that can be used to find past messages. The recipient centric messaging system 100 may leverage established practices in the industry in providing such search capabilities for messages within an Inbox.

Further the recipient centric messaging system 100 attempts to address some of the fundamental drawbacks of prior messaging systems or networking systems by building a "direct" connection between the buyers of attention (e.g. an advertiser) and sellers of attention (e.g. an industry expert or any consumer) and ensuring that the compensation amount ($$) for attention are transferred directly between these two parties without the intermediating service owner keeping all of the money. The recipient centric messaging system 100 is the "direct connection" established between the sender and recipient of messages, and transfer of value for time/attention provided.

The group messaging module 118 provides the option to the sender to send group messages that are also 1-many messages within the recipient centric messaging system 100. For example, one could establish a group within the recipient centric messaging system 100 that corresponds to all residents in a building-complex. The building owner could send messages to the whole group if an unidentified car had its security-alarm blaring in the parking lot, and so on.

The user interactions storage database (S4) 108 stores all interactions that are generated across all clients and server-side components. In one embodiment. The user interactions storage database (S4) 108 and the performance notification module (M7) 124 are performance indicators, e.g. time to load the app on mobile phone, time to load a message page, play a video, server-side responses, and soon. In another embodiment, the user interactions storage database (S4) 108 and the performance notification module (M7) 124 could be an indicator of user engagement (e.g. indicate how often they interact with the mobile app, how often do they send messages, at what times of the day gathered with user permission etc.) allowing a user to optimize those metrics. The recipient centric messaging system 100 may achieve such interaction data either on the system or with external partner services.

The performance notification module 124 looks at all data across all databases (e.g. what fraction of the profile they have completed, when was it that they last interacted with the system, etc.) and sends notification messages to users to increase their engagement and satisfaction with the messaging system solution, in an embodiment. The performance notification module 124 attempts to keep a global view of "user journey" so that user avoid siloed behaviors and messaging, ensuring that the user has a consistent and pleasant and non-spammy interaction with the messaging system solution.

Figure 2A:
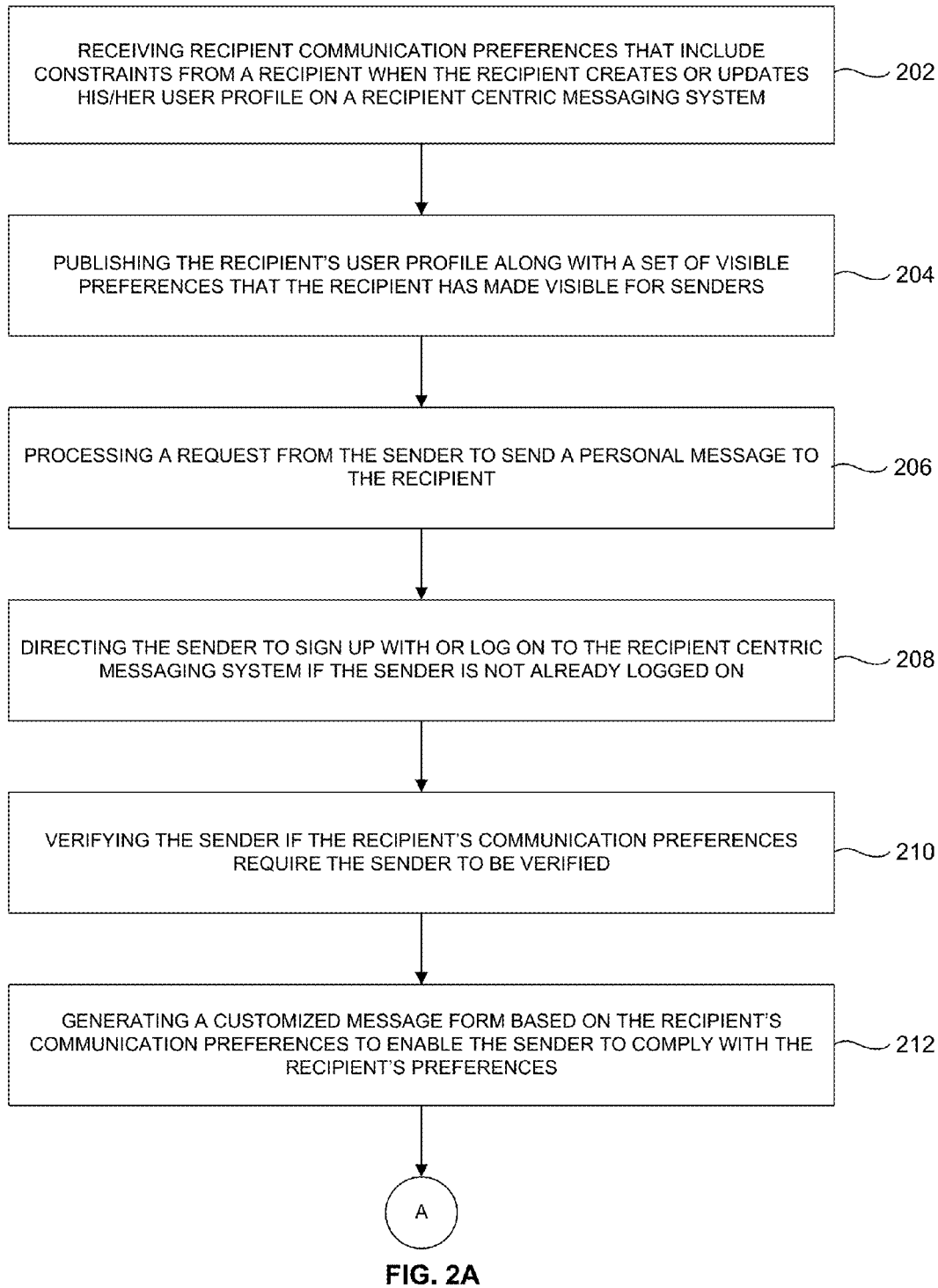
FIGS. 2A-2C illustrate a process view of a sender sending a message to a recipient using the recipient centric messaging system of FIG. 1 according to an embodiment herein.
Figure 2B:
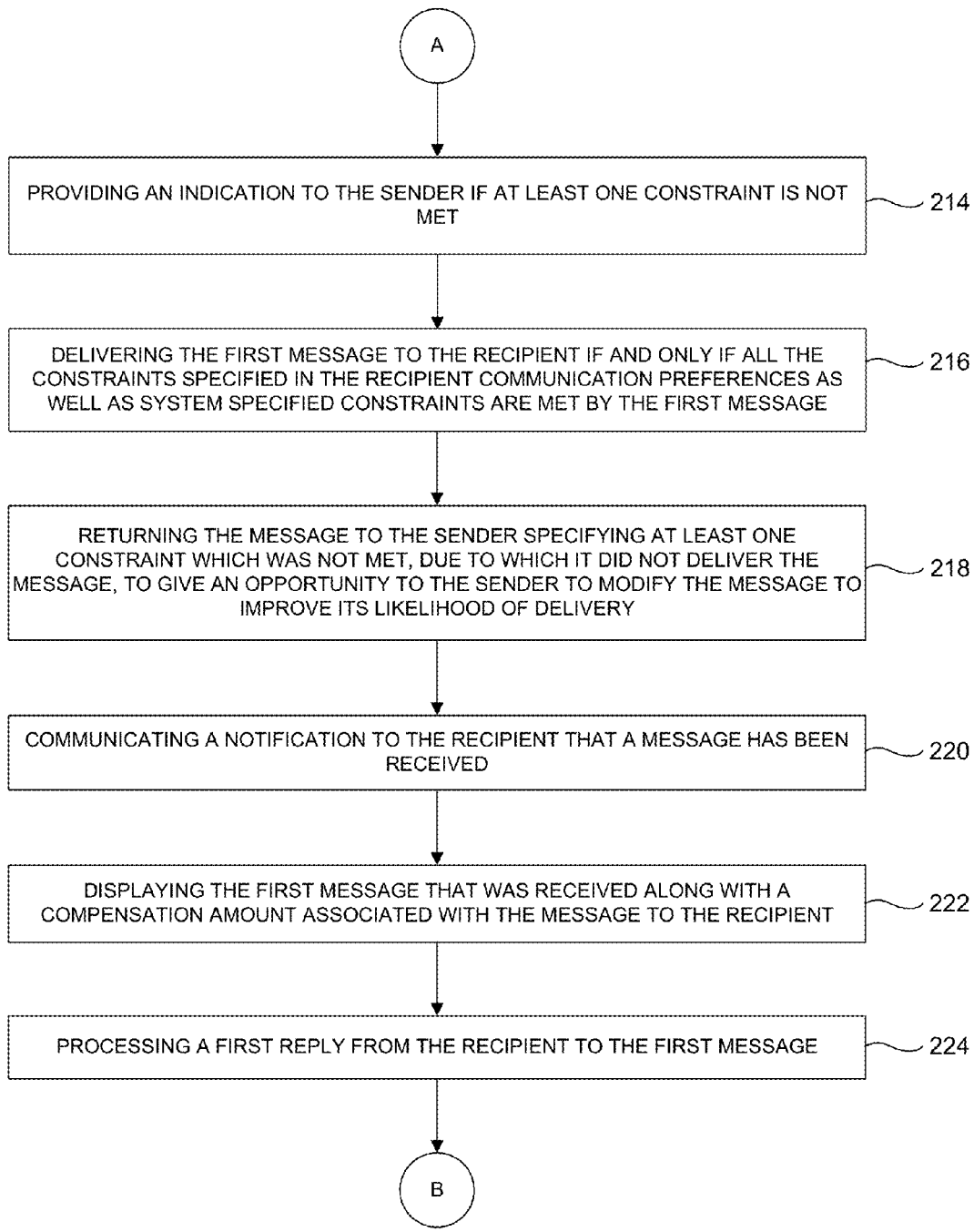
Figure 2C:
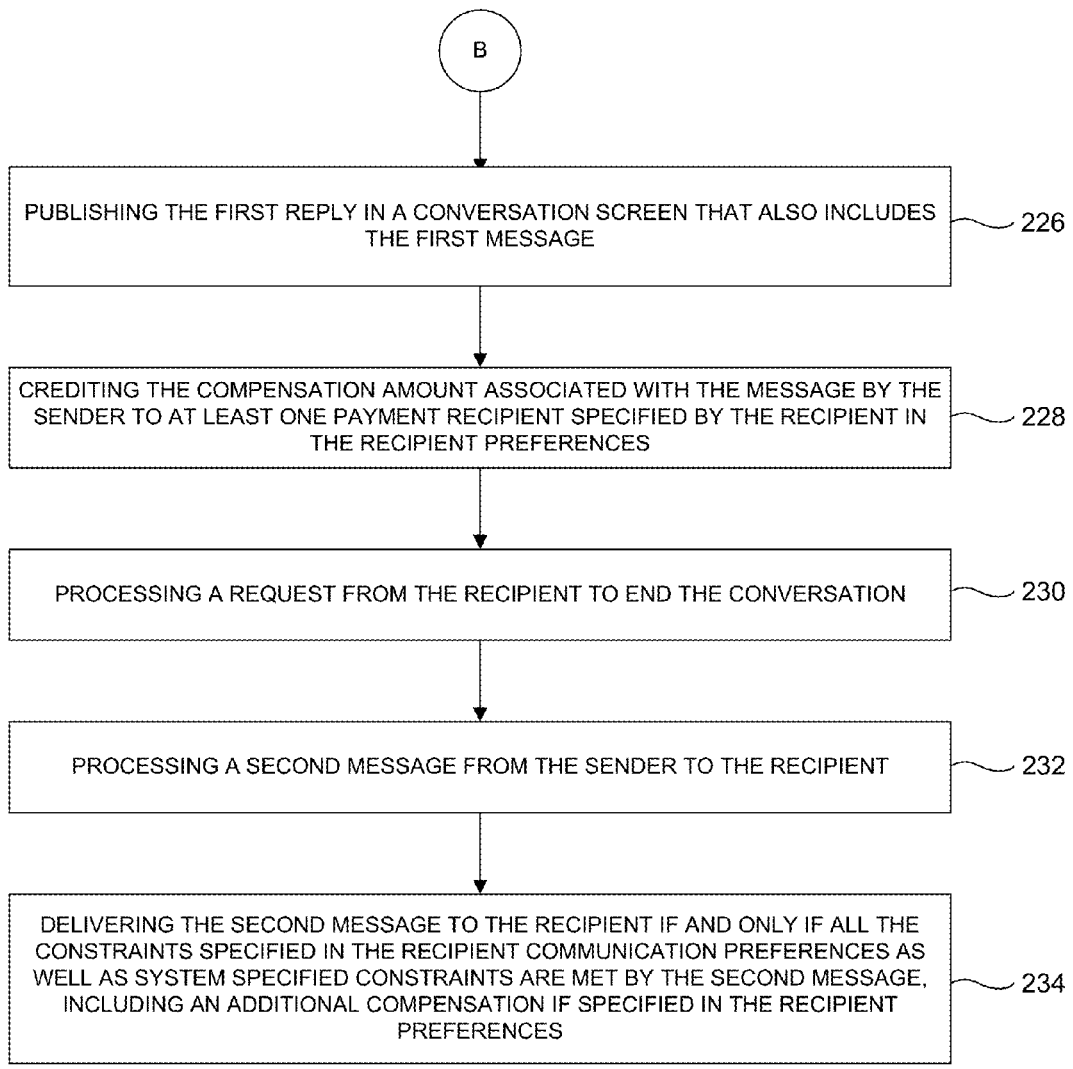

FIGS. 2A-2C illustrate process views of a sender sending a message to a recipient using the recipient centric messaging system of FIG. 1 according to an embodiment herein. At step 202, the recipient centric messaging system 100 receives recipient communication preferences that include constraints from the recipient when the recipient creates or updates his/her user profile on the recipient centric messaging system 100. At step 204, the recipient centric messaging system 100 publishes the recipient's user profile along with a set of visible preferences that the recipient has made visible for senders. At step 206, the recipient centric messaging system 100 processes a request from the sender to send a personal message to the recipient. At step 208, the recipient centric messaging system 100 directs the recipient to sign up with or log on to the recipient centric messaging system 100 if the sender is not already logged on to the system. At step 210, the recipient centric messaging system 100 may verify the sender if the recipient's communication preferences require the sender to be verified. At step 212, the recipient centric messaging system 100 generates a customized message form based on the recipient's communication preferences to enable the sender to compose the message to comply with the recipient's preferences. At step 214, the recipient centric messaging system 100 provides an indication to the sender if at least one constraint is not met. At step 216, the recipient centric messaging system 100 may deliver a first message to the recipient if and only if all the constraints specified in the recipient communication preferences as well as system specified constraints are met by the first message. At step 218, the recipient centric messaging system 100 may return the message to the sender specifying at least one constraint, which was not met, due to which it did not deliver the message, and gives an opportunity to the sender to modify the message to meet the constraints. In one embodiment, the recipient centric messaging system 100 indicates that the message has not met a constraint (e.g. attached money) when the sender is drafting/composing the message. In another embodiment, the recipient centric messaging system 100 performs a verification and returns the message to the sender if the message has not met a constraint. The recipient centric messaging system 100 may perform the verification when the sender hits the send button (e.g. the content verification service may kick-in only after a send-key is hit).

At step 220, the recipient centric messaging system 100 communicates a notification to the recipient that a message has been received. At step 222, the recipient centric messaging system 100 displays the first message that was received along with a compensation amount associated with the message to the recipient. At step 224, the recipient centric messaging system 100 processes a first reply to the first message from the recipient. At step 226, a first reply is published in a conversation screen that also includes the first message. At step 228, the recipient centric messaging system 100 credits compensation associated with the message by the sender to a payment recipient specified by the recipient in the recipient preferences. In one embodiment, the payment recipients may be distributed amongst a (i) charity-1 to receive 20% of compensation money, (ii) charity-2 to receive another 20% of compensation money, (iii) and the recipient to keep remaining 60% of compensation money.

In one embodiment, the recipient centric messaging system 100 triggers the payment (i) when the recipient sends the reply message to the sender, (ii) when the recipient has sufficiently watched a video that is attached with the message, (iii) when the recipient answered a question in a survey, and etc. At step 230, the recipient centric messaging system 100 processes a request from the recipient to end the conversation. At step 232, the recipient centric messaging system 100 processes a second message from the sender to the recipient. At step 234, the recipient centric messaging system 100 delivers the second message to the recipient if and only if all the constraints specified in the recipient communication preferences as well as system specified constraints are met by the second message, including an additional compensation if specified in the recipient preferences.

An example of how the system protocols might work for a sender may involve authenticating a user, and then retrieving recipient preferences. A client device may render the user experience of the message creator by displaying the message form that honors those recipient preferences. At this point, the preferences might also state that the sender can't send this recipient a message (e.g., because they are on a blacklist for that recipient or globally because of previously sent spam messages). The sender may send the message and get back a response token. The message could be rejected if the recipient's preferences aren't met. The response token could either be an event based callback or a token that the client can use to poll for the result. In the system, messages may not be delivered immediately since they are checked for inappropriate content, they may require payment etc. The response token allows the sending client to receive the status of the message and take action in case the message was rejected (e.g., by changing the text, paying for the message etc.) On the recipient side, the APIs allow for the unique nature of the mailbox and have API's that allow for retrieving messages by category, tags, source, money etc. They may also get high-level information about the mailbox (e.g., a number of messages, total money attached, total money in the account, unread messages etc. The recipient centric messaging system 100 may further include APIs to manage recipient preferences, mailbox preferences etc.

The protocols may allow the recipient centric messaging system to (a) show the relevant categories based on the recipient preferences, (b) enforce minimum stamp requirements, honor code etc., (c) receive the compensation amount from the sender to send the message, (d) send the message to the recipient and debit the amount from the sender account, (e) deliver the message to the recipient inbox and wait for the recipient response on the message, and (f) credit the compensation amount to the recipient account if the recipient responds to the message, or else refund the compensation amount to the sender account.

Figure 3:
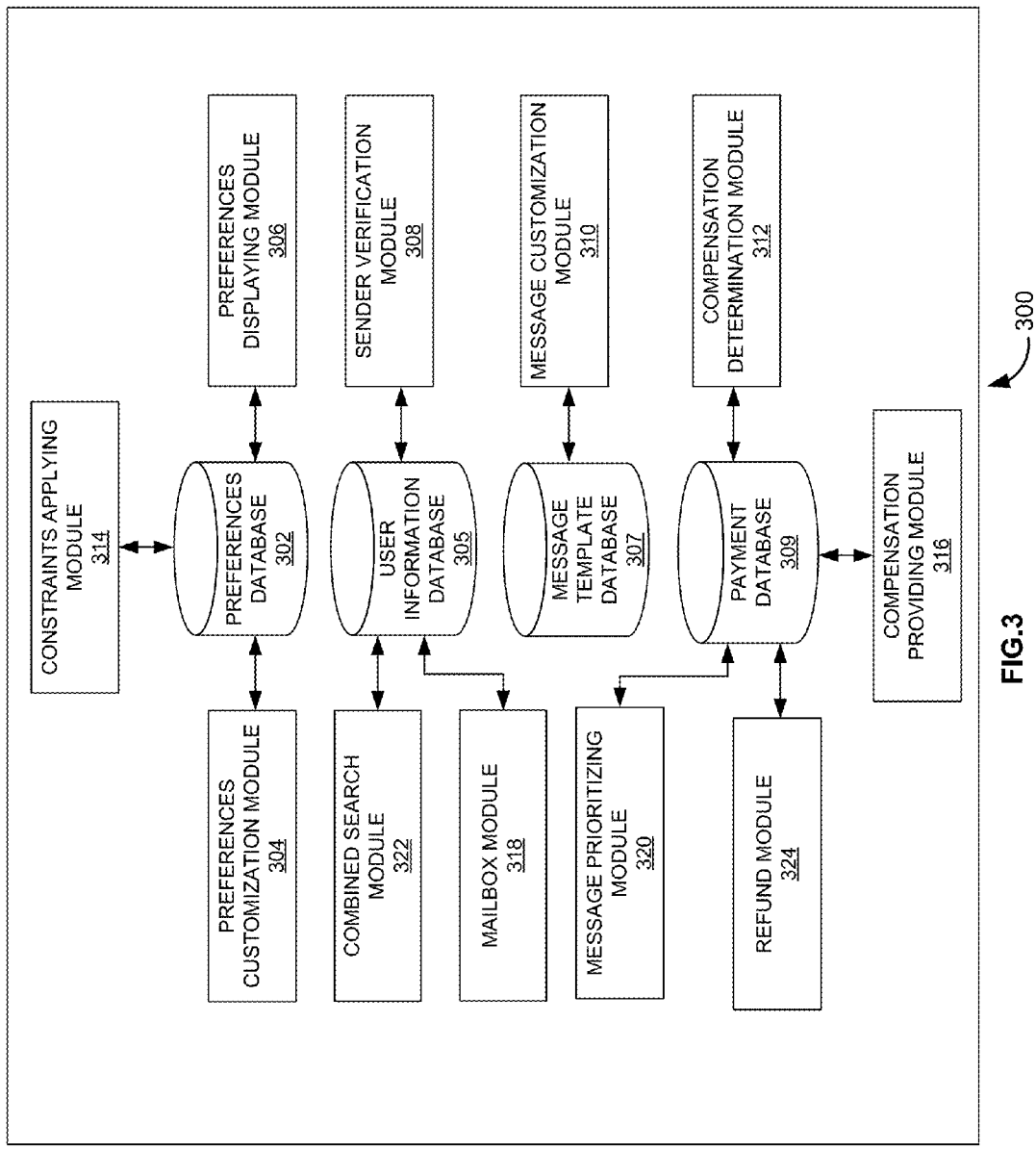
FIG. 3 illustrates an exploded view of the recipient centric messaging system of FIG. 1 according to an embodiment herein.

FIG. 3 illustrates an exploded view 300 of the recipient centric messaging system 100 of FIG. 1 according to an embodiment herein. The functional block diagram of the recipient centric messaging system includes a preferences database 302, a preferences customization module 304, a preferences displaying module 306, a sender verification module 308, a message customization module 310, a compensation determination module 312, a constraints applying module 314, a compensation providing module 316, a mailbox module 318, a message prioritizing module 320, a combined search module 322, and a refund module 324. The preferences customization module 304 is configured to specify/set-up the communication preferences for receiving messages.

In one embodiment, the communication preferences include but are not limited to: (i) a simple text-field indicating areas of interests, (ii) who they wish to connect with and for what purposes, (iii) a limit of characters or words of text that could be in message, (iv) a specification whether images are allowed or not and whether attachments allowed or not, (v) a minimum payment required for delivery of the message, (vi) categories of communication types specified by the recipient, and (vii) a volume of message traffic received by the recipient associated with a certain category of communication etc. The recipient communications preferences may optionally be specified as a logic formula with "AND", "OR", "NOT" clauses among the possible constraints allowed by the system. The preferences customization module 304 is optionally configured to specify the amount that the sender must attach before sending the message to ensure seriousness and/or as compensation for time/attention of recipient. The preferences displaying module 306 is configured to display the recipient preferences to the sender.

In one embodiment, some of recipient preferences may not be visible to the sender e.g., black-lists of senders. The sender verification module 308 is configured to verify the sender before sending a message to the recipient. The sender may be required to be verified using their social identities, mobile number, personal documents etc. For example, (i) an email may be verified by sending an email to the specified account and getting the challenge response back, (ii) the mobile phone number may be verified by sending a code via SMS to that phone and receiving a response code back, etc. If using a social identity like Twitter, that site verifies the user. For example, Twitter has a concept of a verified user, which is information that is available to the message site when the user logs in using Twitter. The personal documents (e.g. a driving license etc.) may be verified by checking the license number with a database.

The message customization module 310 is configured to automatically generate a message-form where the sender enters the message. In one embodiment, the message-form displays the recipient preferences/constraints. In another embodiment, the message-form generated is based on the communication preferences of the recipients. The compensation determination module 312 is configured to determine a compensation amount for sending a message to a recipient. For example, (i) the compensation determination module 312 may determine that the compensation amount is zero when the sender wishes to send a personal message (e.g., to a person who is known or who he has corresponded with earlier), and (ii) the compensation determination module 312 may determine that the compensation amount is a minimum of $2 when the sender wishes to send sponsored/marketing messages. In one embodiment, the compensation determination module 312 determines how much money the sender may want to attach to their message to get the recipient's attention immediately by being the top-message (e.g., or be in the top-10 unread messages, or based on what other pending messages have paid, or based on other digital auction-logic) in the recipient's inbox. In another embodiment, the compensation amount is suggested by the compensation determination module 312 based on (i) amounts associated with existing messages received by the recipient and priorities of the existing messages in order to increase a priority of the message for the recipient, (ii) one or more properties of content associated with the message, wherein the one or more properties of content include a length of a video that is attached with the message, or (iii) an amount of attention required by the recipient. In one embodiment, the compensation may also be other virtual points/goods as often use in gaming systems or search competitions.

The constraints applying module 314 is configured to verify whether the required constraints (e.g. computer interpretable constraints and human interpreted constraints) are met to send the message to the recipient. The computer interpretable constraints may be but are not limited to (i) a character limit mentioned by the recipient, (ii) does the message including attachments, (iii) is a minimum compensation money attached to the message, (iv) is the message received from a verified sender, etc. The human interpreted constraints may include whether the message is related to a topic of interest to the recipient or not. The recipient centric messaging system 100 may allow the sender to verify that the communication preferences of the recipient are met by the message, and (ii) allows the sender to certify that the message respects the recipient's communication preferences. However, if the recipient reports the message as misclassified, inappropriate, or not meeting certain constraints, the reputation score of the sender is affected adversely. The recipient centric messaging system 100 may enforce constraints based on regulations that affect the recipient. For example, certain government employees may not be able to receive money or lawyers might have other such restrictions. In one embodiment, the recipient is able to relax one or more of the constraints needed for the sender if the sender known to the recipient outside of the recipient centric messaging system 100.

The compensation providing module 316 is configured to transfer the compensation amount mentioned in the message to the recipient along with the message. In one embodiment, the sender needs to add money to their messaging system account before they can dispatch the message. The compensation providing module 316 credits a percentage of the compensation amount for the message to an account associated with the recipient centric messaging system 100 for facilitating the messaging and for exchange of the compensation money from the sender to the recipient. The compensation providing module 316 may provide some privileges to the recipient when the recipient invites one or more new users to the recipient centric messaging system. The privileges may include (a) credit the compensation amount to a recipient centric messaging system account of the recipient, or (b) providing free messages to the recipient. The mailbox module 318 is configured to manage the messages received from the different recipients. The recipient centric messaging system 100 may be used as the single communication address across all websites, and so it keeps track of the origin of the message. (e.g., whether it originated on Quora, LinkedIn, Medium etc). In one embodiment, the mailbox module 318 ensures a higher-quality communications experience between senders and recipients of messages by providing the recipient with a single place to manage all their communication from people outside of their social network.

The message prioritizing module 320 is configured to receive the message from the sender and prioritize the message based on the compensation amount attached with the message. The message prioritizing module 320 may order the message in the recipient inbox based on the compensation amount attached with the message. In addition to money, the message prioritizing module 320 can use other information like whether the sender is known to the recipient, the time the message was received etc. to decide on the ordering. At any time, the user (e.g., the recipient) is free to also sort the messages by other criteria (e.g. unread messages, by compensation, by time of arrival etc).

The combined search module 322 is configured to search for the recipients, or the group to send the message. The combined search module 322 provides (i) full-text search option to filter the individuals'/entities' profiles based on any of the text-fields in user profile (e.g., name or designation of user/recipient), and (ii) faceted search option to filter the individual's/entities profiles based on location/cities, current or past companies, industry-segments, educational institutions, etc. to narrow down the scope of search. The refund module 324 is configured to provide choices to the recipients to dispose of that compensation money in flexible ways, or automatically take action based on default preferences of the user/recipient. The refund module 324 allows for or provides choices to recipient to (i) return the compensation money to the sender, (ii) donate part of compensation money to charity and keep the remaining money for recipient, and/or (iii) donate all of the compensation money to a previously selected default charity, or to a freshly selected charity just for selected message. In one embodiment, the refund module 324 automatically donates money to the charity without entering the money into the recipient account of the recipient centric messaging system 100. In another embodiment, the money is donated directly by the sender to a charity of the sender's choice. The refund module 324 is configured to return the money, or part of the money to the sender of the message, if the recipient does not provide attention for a certain passage of time or does not meet any other criteria specified by the sender.

The functional block diagram 300 further includes a preferences database 302, a user information database 305, a message template database 307, and a payment database 309. The preferences database 302 stores communication preferences for one or more users/recipients. In one embodiment, the communications preferences may be (i) a simple text-field indicating areas of interests, (ii) who they wish to connect with and for what purposes, (iii) a limit of characters or words of text that could be in message, (iv) a specification whether images are allowed or not and whether attachments allowed or not, etc. In one embodiment, the preferences are stored in the preferences database 302 as rules. The user information database 305 may store information about both "users/people" but also about other possible entities, such as businesses or groups that could be both senders and recipients of communications. The user information database 305 stores information such as name, address, picture, email-addresses, phone no, date-of-birth, driver's license number and images, background-picture for profile page, education history, employment history, links to the person or entities social networks, etc. The message template database 307 stores one or more message template/forms that are used to send messages. The one or more templates may include (i) a template that is used to send a personal message, (ii) a template that used to send business messages, (iii) a template that used to send a message which is below 140 words, and (iv) a template that used to send message which is more than 140 words, (v) a template to send a business plan proposal for funding, etc. The payment database 309 stores monetary details of the sender and recipient accounts. For example, how much the senders and recipients have in their messaging system account. The payment database 309 may also store how much the sender used for sending the one or more messages, and how much the recipient received from one or more senders.

The exploded view 300 of the recipient centric messaging system 100 further includes a reputation scoring module that is configured to determine a reputation score for each the sender/recipient in the system to be able to report/find spam senders, and have an idea of responsive recipients. In one embodiment, the recipient centric messaging system 100 may report the spam senders, and the responsive recipients based on (i) what kind of message the sender sends to the recipients, and (ii) how much time the recipient taken to respond to the sender's message. The reputation scoring module determines the reputation score for the sender based on feedback from the recipient on (i) a priority level of the first message, (ii) whether the first message is properly classified by the sender (e.g. the message title is a personal message, but the message may related to promotion or advertisement), and/or (iii) whether the message is offensive or inappropriate to the recipient.

The reputation scoring module may determine the reputation score for the sender based on an analysis of a message history of the sender using predefined rules based a (a) number of messages sent by the sender to the recipient, (b) fraction or percentage of messages marked as irrelevant messages by the recipient, and (c) fraction or percentage of messages replied to by the recipient. The reputation scoring module may determine the reputation score for the sender using a machine learning algorithm which analyzes a plurality of parameters selected from a group consisting of (a) number of messages sent by the sender to one or more recipients, (b) fraction or percentage of messages replied to by the one or more recipients, (c) relevance ratings assigned to the messages by the one or more recipients, (d) length of replies sent by the recipient, and/or (e) sentiment analysis of the messages.

Figure 4B:
Figure 4C:
FIGS. 4C-4D illustrates user interface views of specifying recipient preferences according to an embodiment herein.
Figure 4D:
Figure 5B:

FIGS. 4A-4B illustrates user interface views of creating or updating a recipient profile based on social network accounts according to an embodiment herein. The recipient profile may be updated based on (i) a headline/summary from a Twitter profile 402, (ii) what type of messages the recipient is interested in 404, (iii) what type of messages the recipient is willing to receive 406, (iv) custom categories of messages types that can be created by the recipient 407, and/or (iv) a headline or summary from the recipient's LinkedIn profile 408. FIGS. 4C-4D illustrates user interface views of specifying recipient preferences according to an embodiment herein. The recipient preferences may include (i) who can message the recipient 410 (e.g., anyone, or, verified users, or only user who pay at least $1), (ii) would the recipient be open to accepting money for replying to messages 412 (e.g., yes, yes and donate to charity, or No), (iii), a limit of characters or word of text that could be in message 416 (e.g., 100, or 150, or 500, etc.), (iv) whether images are allowed or not 418 (e.g., allowed, or not allowed), (v) what kind of attachments are required 420 (e.g., allow PDF, block images/videos, etc.,), (vi) whether the messages should be passed through a profanity-filter or not 422, (vii) what kind of verification is required for the sender 424 (e.g., phone verification, twitter verification, LinkedIn verification, credit card account verification), (viii) whether a sender must prove they are human via a captcha 426, and (ix) what are the options for the received money 430 (e.g., donate to charity, redeem as a gift care, transfer to a bank account). The user interface views may also present what people are paying the recipient for 414 (e.g., to represent the importance of the message to sender, or to express their desire to reach the recipient, or to reply to the message within 7 days), and why the recipient should set a price 428 (e.g., to receive only serious messages, and filter out inappropriate content).

In one embodiment, the communications preferences may be (i) simple text-field indicating areas of interests, (ii) who they wish to connect with and for what purposes, (iii) limit of characters or words of text that could be in message, (iv) specification whether images are allowed or not and whether attachments allowed or not, (v) categories of message types specified by the recipient potentially with different payment requirements by category etc. In another embodiment, the recipient preference may be (i) a request to fill in information in a particular template (e.g., the recipient centric messaging system 100 requests a particular format for a business pitch, and (iii) the senders must state how they know the recipient. In another embodiment, the recipient communications preferences may optionally be specified as a logic formula with "AND", "OR", "NOT" clauses among the possible constraints allowed by the system. For example, the recipient may say that the sender must be verified either via Twitter OR via Facebook and the sender must have to verify a mobile number. The user interface views of the preferences customization module 304 displays the amount that the sender must attach before sending the message to ensure seriousness and/or as compensation for time/attention of the recipient. The recipient's communication preferences are displayed to the sender when the sender selects the particular recipient from the messaging system contact, or LinkedIn contact, or Facebook contact, etc.

The communication preferences may further include (a) message types, attention units, and revenue share (e.g. whether the recipient receive the message without payment or not), (b) the recipient requires a minimum stamp to receive the professional message, (c) the recipient receives the promotional message when the promotional message is attached with minimum of 30 AUs (Attention Units), and (d) donating part of the compensation amount to a charity. In one embodiment, an attention unit is associated with a fix sum of money (e.g. 50 cents) or virtual goods.

The sender may be able to view recipient preferences in advance of sending message to recipient. In one embodiment, blacklists of senders may not be made visible to recipient's preferences. The recipient may enforce a limit to the number of messages that the sender can send without payment (e.g. the recipient may receive 3 messages from the sender without the compensation amount). In an embodiment, the number of messages that are allowed to be sent without the compensation amount is determined based on the reputation score of the sender. In one embodiment, the limit to the number of messages may prevent the senders from sending low quality messages to the recipients. The recipient is able to relax all the constraints needed for the sender if the sender is a known person to the recipient outside the recipient centric messaging system 100 (e.g. sender may be a colleague, may be a school mate, may be a college mate, etc.).

5A-5B illustrate user interface views of a recipient profile with a list of visible recipient preferences made visible to a sender and options to contact the sender according to an embodiment herein. In this example, a recipient (e.g. Jane Reed) shows her communication preferences 502 that she only accepts messages from verified senders, she is open to accepting money for replying to messages, and she requires pdf attachments for start-up pitches for example. Further, she may specify a character limit to the messages (e.g., 100 characters). She may be open to either accept a personal message 504, or an anonymous comment 506. She may further indicate her areas of interest such as start-up pitches, expertise requests, business opportunities etc. The recipient profile with the communication preferences may be discovered when the sender searches and browse for recipient's profiles and selects a particular recipient (e.g. Jane Reed) from the search results. The sender can view the communication preferences and initiate to send the message when selecting the particular recipient from the search result. The sender may search for the recipient based on a full-text search" and/or a "faceted search". The full-text search is used to filter the individual/entities based on any of the text-fields in user profile, while faceted search takes advantage of known entities (e.g. location/cities, current or past companies, industry-segments, educational institutions, etc.) to narrow down the scope of search.

Figure 6:
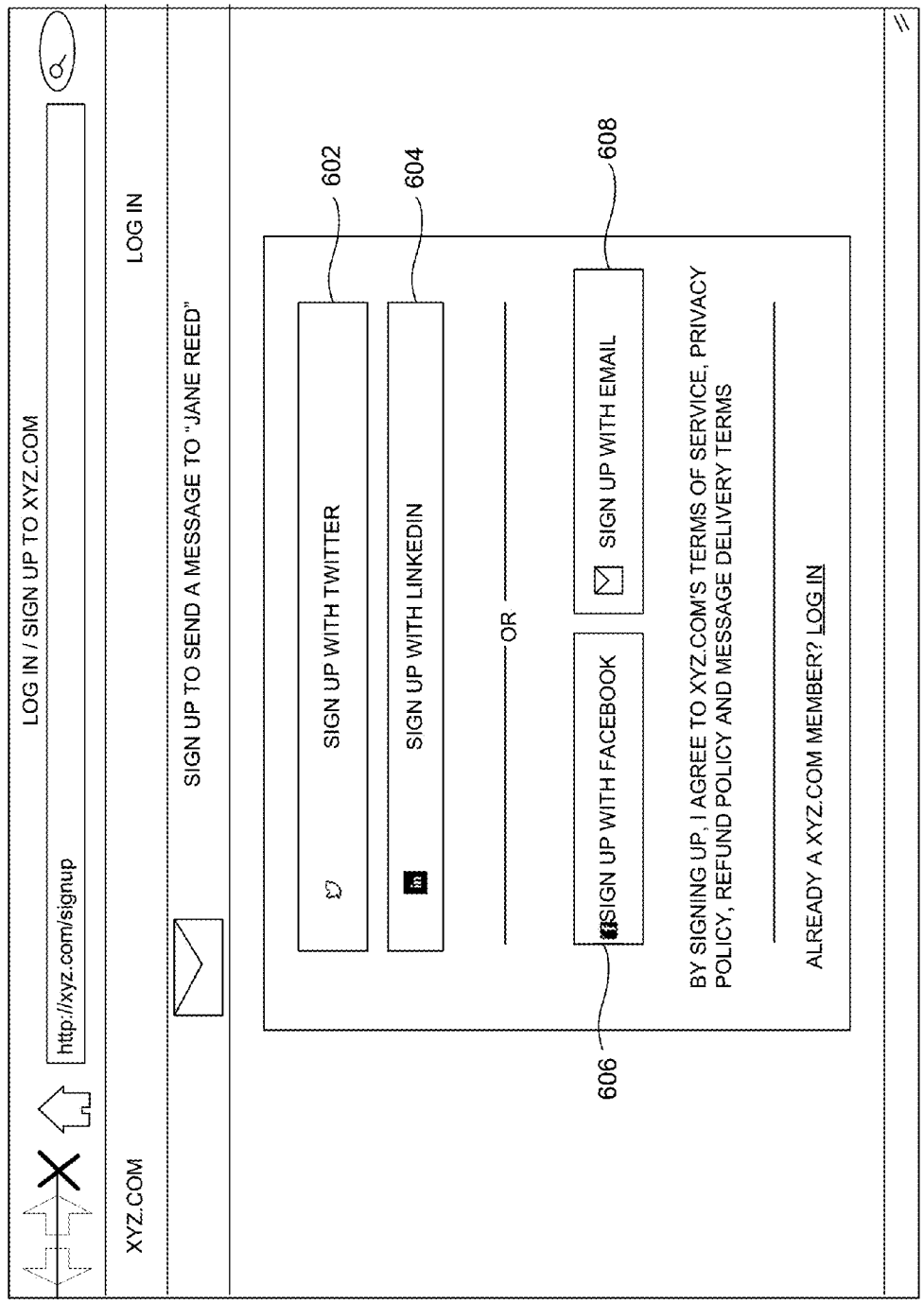
FIG. 6 illustrates a user interface view of the sender signing up with the recipient centric messaging system of FIG. 1 using an email or a social network account according to an embodiment herein.

FIG. 6 illustrates a user interface view of the sender signing up with the recipient centric messaging system 100 of FIG. 1 using an email or a social network account according to an embodiment herein. The recipient centric messaging system 100 may require the sender to sign up when the sender wishes to send a message to a registered user. The user interface view illustrates that the sender may sign up using a twitter account 602, a LinkedIn account 604, a Facebook account 606, an Email account 608, etc. When the user signs up he/she will be able to send and receive the messages. In one embodiment, the user interface view of the signing up module provides an option to create a new account within the recipient centric messaging system 100 for a new user.

Figure 7A:
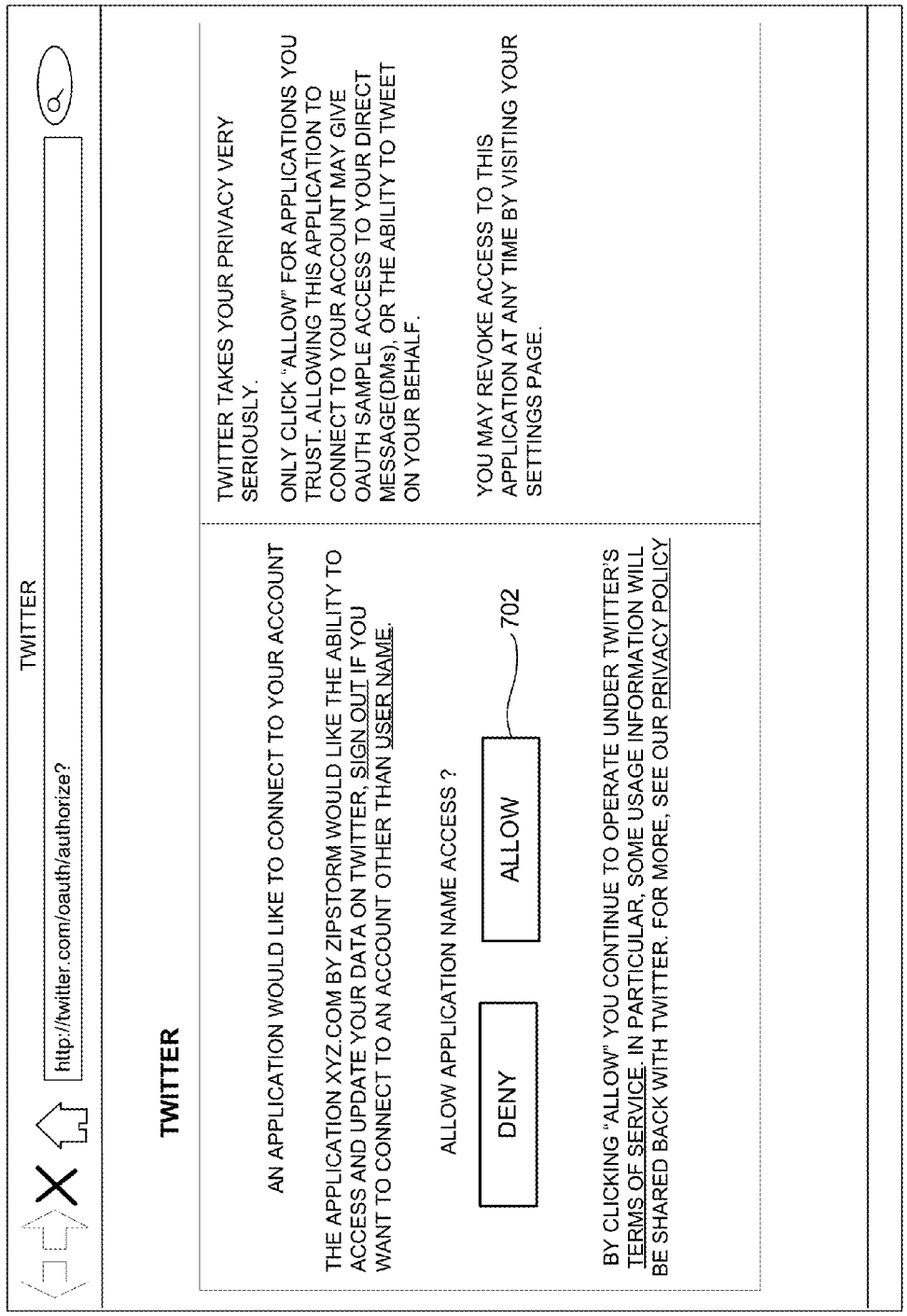
FIGS. 7A and 7B illustrate user interface views of linking the recipient centric messaging system of FIG. 1 to the sender's social network accounts according to an embodiment herein.
Figure 7B:
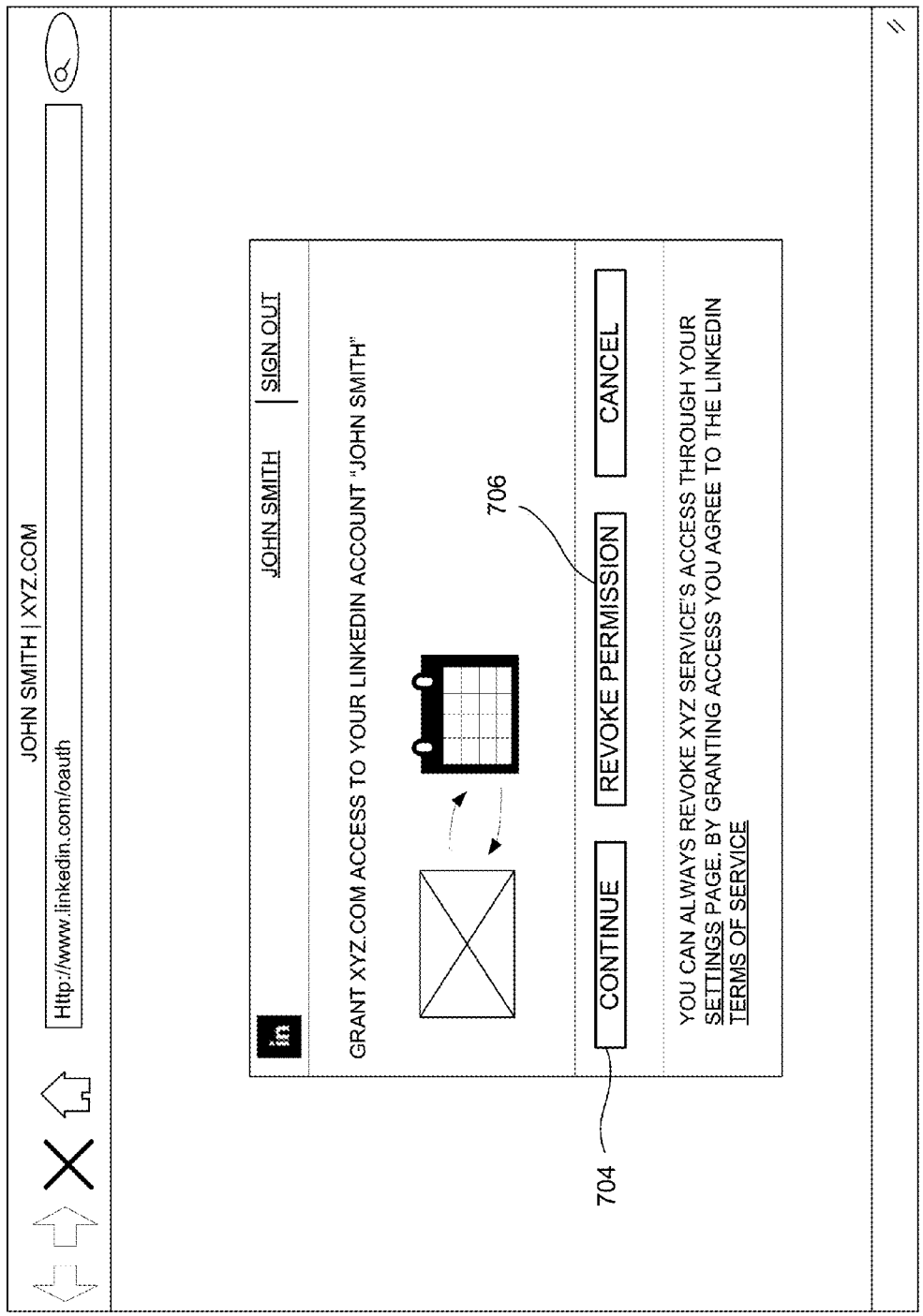

FIGS. 7A and 7B illustrate user interface views of linking the recipient centric messaging system 100 of FIG. 1 to the sender's social network accounts according to an embodiment herein. The user interface views provide the option to connect a Twitter account, or a LinkedIn account to the recipient centric messaging system 100. When selecting an allow option 702, the user grants the recipient centric messaging system 100 access to his/her Twitter account messaging system account. When selecting a continue option 704, the user grants the recipient centric messaging system 100 access to his/her LinkedIn account. When selecting revoke permission option 706, the access to the LinkedIn account is revoked.

Figure 8:
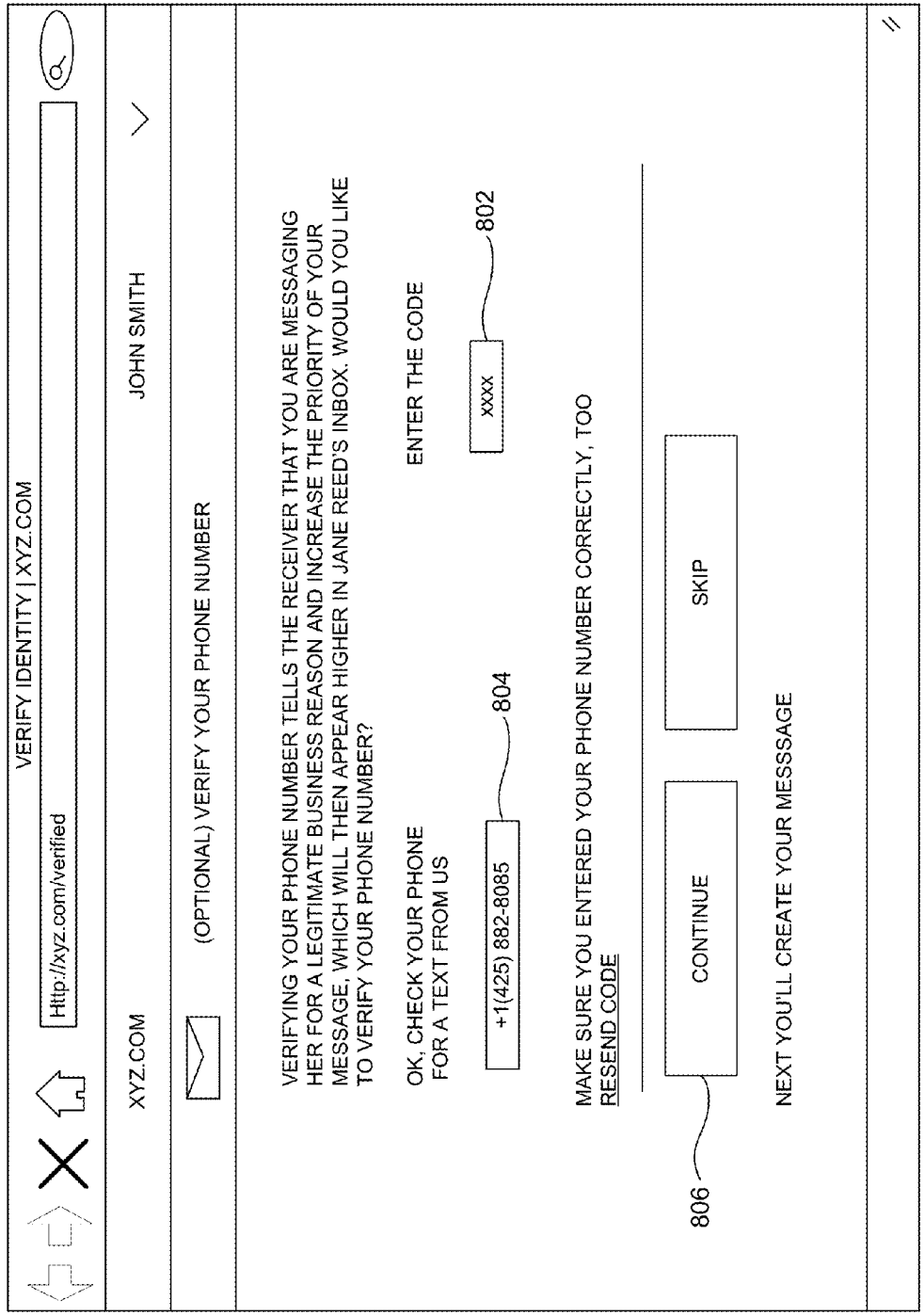
FIG. 8 illustrates a user interface view of the recipient centric messaging system of FIG. 1 verifying a sender by verifying his mobile phone number according to an embodiment herein.

FIG. 8 illustrates a user interface view of the recipient centric messaging system 100 of FIG. 1 verifying a sender by verifying his mobile phone number (e.g., of the using sender verification module 308) according to an embodiment herein. The user interface view allows the sender to verify the messaging system account by entering a secret code 802, which is received through a registered mobile number 804. After verification, the sender may access the messaging system to send the messages when selecting a continue option 806. In one embodiment, a skip option is used to skip the verification process. In one embodiment, the user interface view of the sender verification module 308 provides a captcha to check whether the sender is human or not. In another embodiment, the sender verification module 308 may send the activation link to the sender's email to verify the messaging account. The verification prevents spam and inappropriate messages from being delivered to the recipient. In one embodiment, the recipient has the ability to specify that the sender is verified using a variety of mechanisms (e.g. through a secret code send to the mobile, or through captcha, or through sending an activation link to the sender's email, etc.).

Figure 9A:
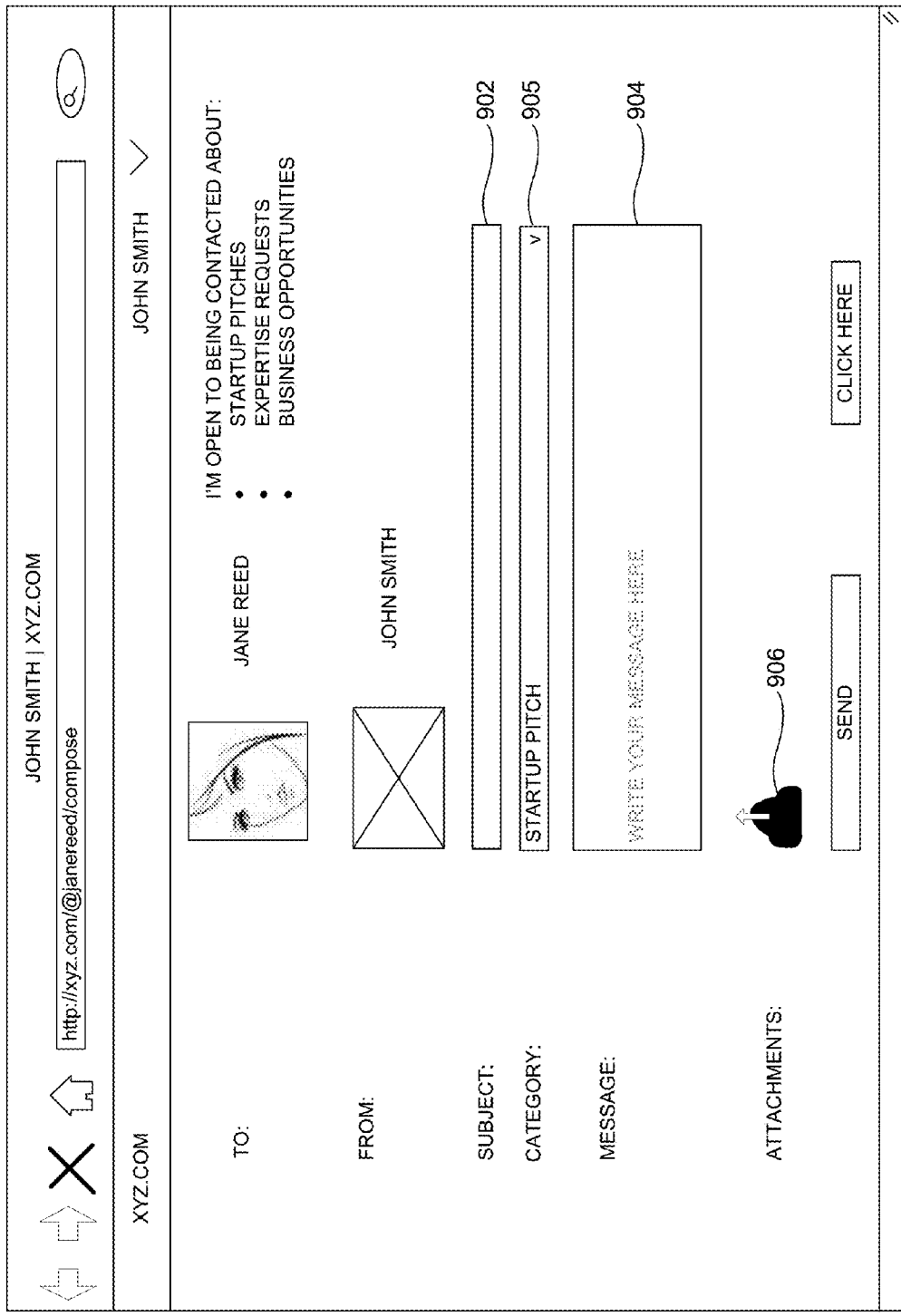
FIGS. 9A and 9B illustrate user interface views of a sender using an automatically generated message form based on the recipient's preferences to compose a message to the recipient according to an embodiment herein.
Figure 9B:
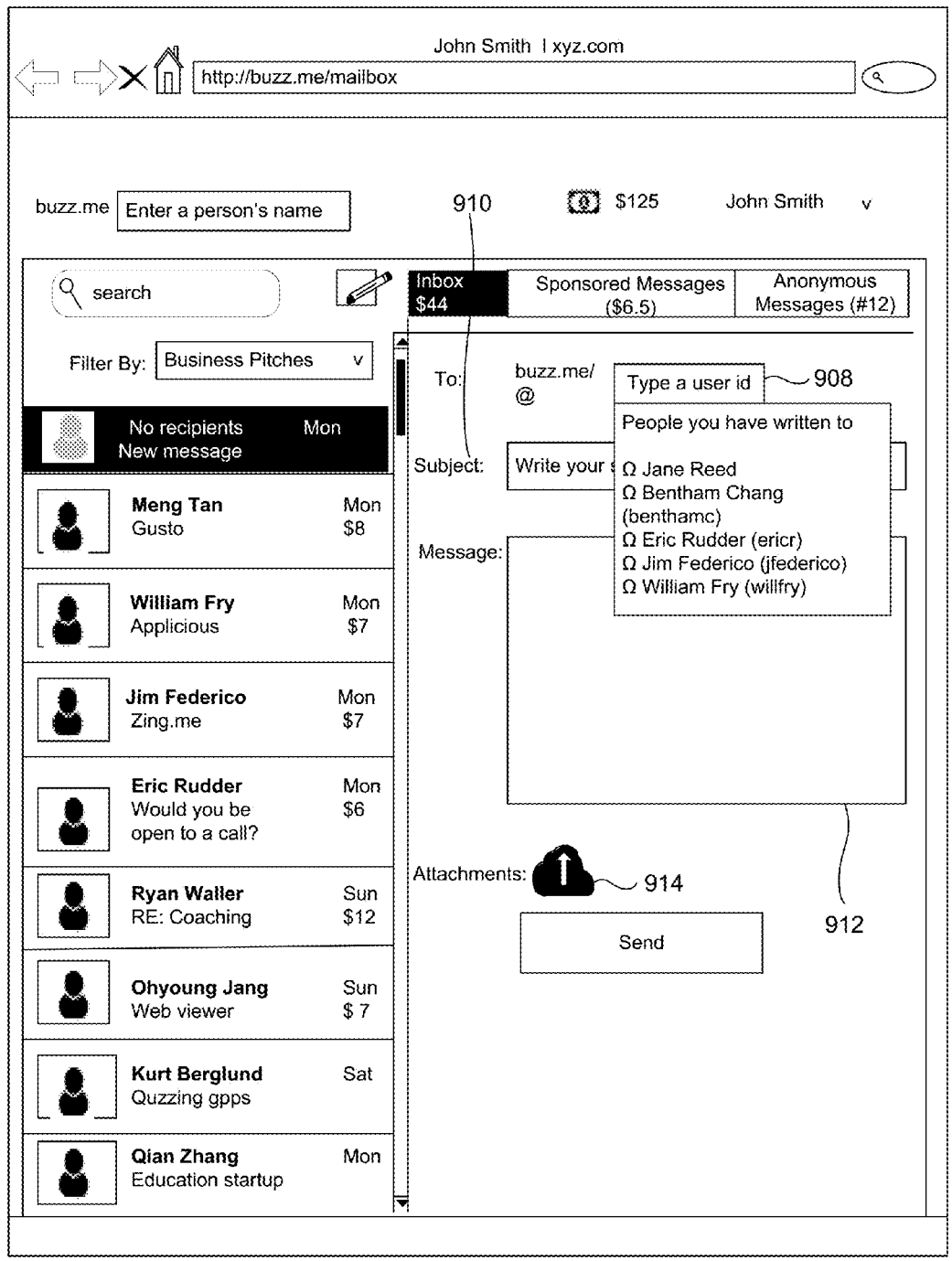

FIGS. 9A and 9B illustrate user interface views of a sender using an automatically generated message form based on the recipient's preferences to compose a message to the recipient according to an embodiment herein. The message form may be generated when the sender clicks on the unique communication address (e.g., structured as a URL) provided by the recipient centric messaging system 100 (e.g. xyz.com/@JaneReed) which can be freely shared on any website (e.g. LinkedIn, Facebook, Quora, etc). While selecting a URL of the unique communication address from any browser or device, the sender is taken to the signing-up module to send the message to the recipient. In an embodiment, the recipient centric messaging system automatically captures the URL of the source as metadata to be attached to the message.

The recipient centric messaging system 100 may keep track of the source of the initiation (e.g. source may be from LinkedIn, or Facebook, or Quora, etc.), and show that to the recipient. The recipient centric messaging system 100 may track the source of the message by tracking the referrer code supplied by the browser and so can inform the recipient of the source of the message. Further, the recipient centric messaging system 100 customizes the message form using the source of the message initiated using the knowledge of the context. For example, if the unique communication address was shown on medium, the sender could also attach the title of the story to the message so that the recipient knows the page that the sender was reading when they decided to send them a message.

Once the sender is successfully verified and signs-up into the messaging system account, the recipient centric messaging system 100 provides the message form to the sender (e.g. John Smith) to enter the message. In one embodiment, the recipient centric messaging system 100 shows the message form along with the preferences and constraints mentioned by the recipient to avoid inappropriate and spam messages. The recipient centric messaging system 100 may automatically generate the message forms based on the recipient's preferences. In one embodiment, the user interface view 900 displays the recipient preferences and constraints when selecting a click here option mentioned in FIG. 9A. The user interface view 900 of the message form provides the following form fields to enter the message: (i) a subject field 902 to write a subject about message, (ii) a message field 904 to enter a message relevant to the recipient's (e.g. Jane Reed) areas of interest within a specified character limit (e.g., 100), (iii) an attachment option 906 to attach say a business plan in a pdf format, and (iv) an option 905 to select the category of the message (as specified by the recipient).

The recipient centric messaging system 100 may provide the user interface view 900 of the message form to the sender when the sender initiates sending the message from any website (e.g. LinkedIn, Facebook, Quora, etc) by selecting the URL of the unique communication address which is shared on the website. In one embodiment, the subject should be within the 100-character limit otherwise the message wouldn't be delivered. In yet another embodiment, the sender must attach a business plan in a specified pdf format for delivery. After entering the subject, message, and attachment, the sender selects a send option to send the message to the recipient.

The message is delivered to the recipient inbox only if all required constraints are met. The constraints may be but are not limited to (i) a character limit mentioned by the recipient, (ii) is the message related to the recipient's topics of interest, (iii) is compensation money attached to the messages, (iv) is the message received from a verified sender, etc. The recipient centric messaging system 100 enforces constraints set by the recipient and may also enforce system specified constraints. For example, certain government employees may not be able to receive money or lawyers might also have other such restrictions. These could be specified as system constraints.

FIG. 9B shows a message form, which is used to send the messages to the recipient from the messaging system account. The user interface view 907 of the message form provides the following form fields to enter the message: (i) a user id field 908 to enter a user id of the recipient to whom the message is sent, (ii) a subject field 910 to write a subject of message, (ii) a message field 912 to enter a message that may be relevant to the recipient (e.g. Jane Reed), (iii) an attachment option 914 to attach any business plan or similar documents specified by the recipient, etc. The sender selects a send option to send the message to the recipient after entering the user id, subject, and message. In one embodiment, the sender can select the user id of the recipient using a dropdown menu. In another embodiment, the dropdown menu includes one or more recipients' user ids, which are already there in the sender's contact list. In yet another embodiment, the user interface views of the message forms show the sender that the recipient is verified, so that there is no fraud by someone else posing as the recipient (e.g., Jane Reed).

Figure 10:
FIG. 10 illustrates a user interface view of the recipient centric messaging system of FIG. 1 computing and suggesting compensation amounts to the sender based on what other people have bid to increase the priority of the message within the recipient's inbox according to an embodiment herein.

FIG. 10 illustrates a user interface view of the recipient centric messaging system 100 of FIG. 1 computing and suggesting compensation amounts to the sender based on what other people have bid to increase the priority of the message within the recipient's inbox according to an embodiment herein. The recipient centric messaging system 100 may determine a current placement of the sender's message in the recipient's inbox (e.g. it is currently placed 12th in recipient's inbox), based on the amounts associated with messages that placed higher, dynamically provides a suggestion to the sender in real time that if you want your message to move up to the top 10 messages you need to pay an additional $3, or if you want your message to move to the top position, you need to pay $25 to the recipient. The user interface view indicates why the sender should attach money to the messages with reasons and terms such as (i) your message shows up prominently in Jane Reed's inbox thereby increasing the likelihood of getting a response, (ii) offering payment shows that you value Jane Reed's time, and appreciate a response, (iii) you are paying for a response to your message—a "thank you, but I'm not interested" is a perfectly valid response, and (iv) If Jane Reed does not reply within 7 days, you will get a full refund. When selecting "yes" the sender may able to add compensation money to move his message to the top 10, or to a top message, for example. In one embodiment, in case where money is attached to the message, if the recipient does not provide attention for a certain passage of time, the money is returned to the sender of the message.

Figure 11A:
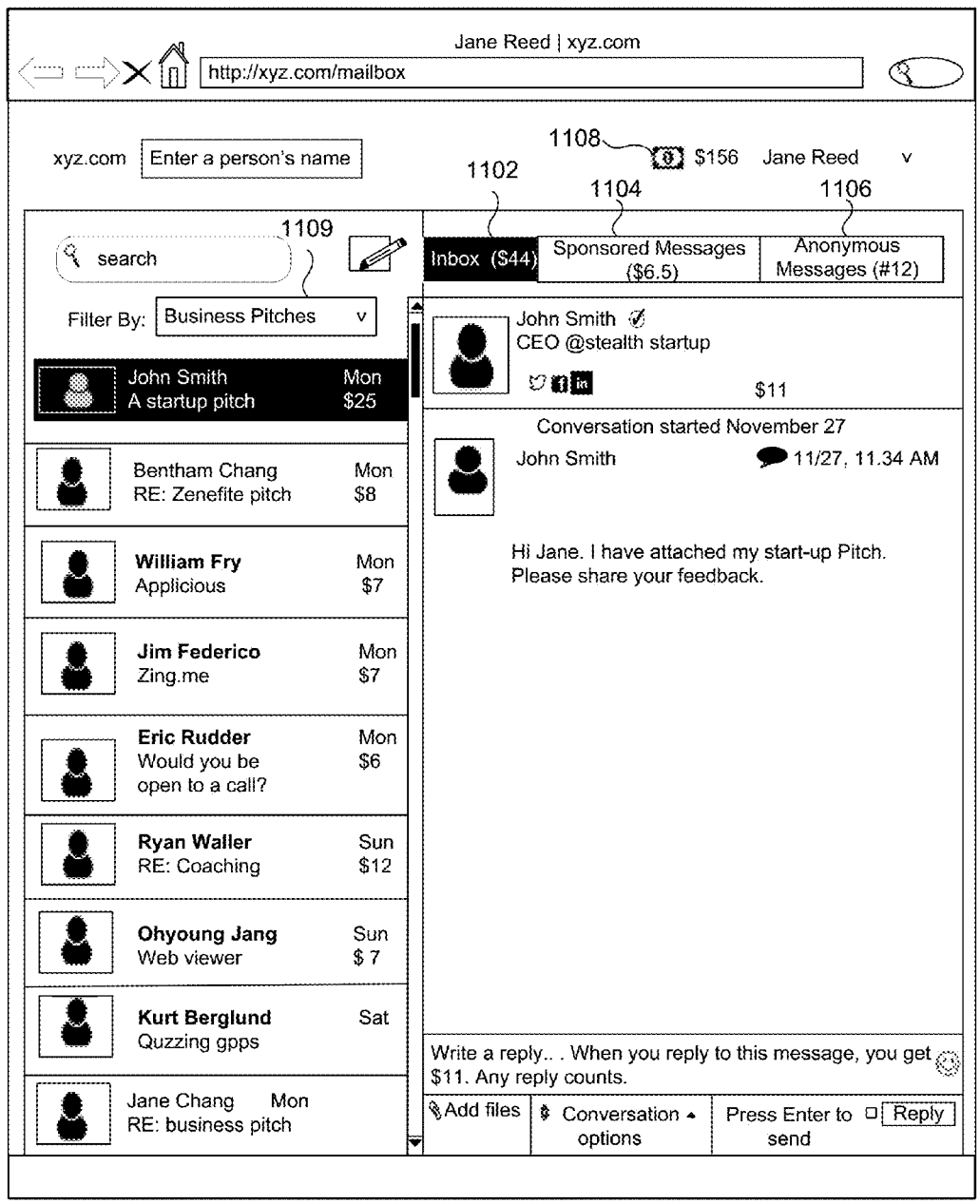
FIGS. 11A and 11B illustrate user interface views of a conversation screen within the inbox of the recipient illustrating conversation options and compensation amounts to be claimed according to an embodiment herein.
Figure 11B:
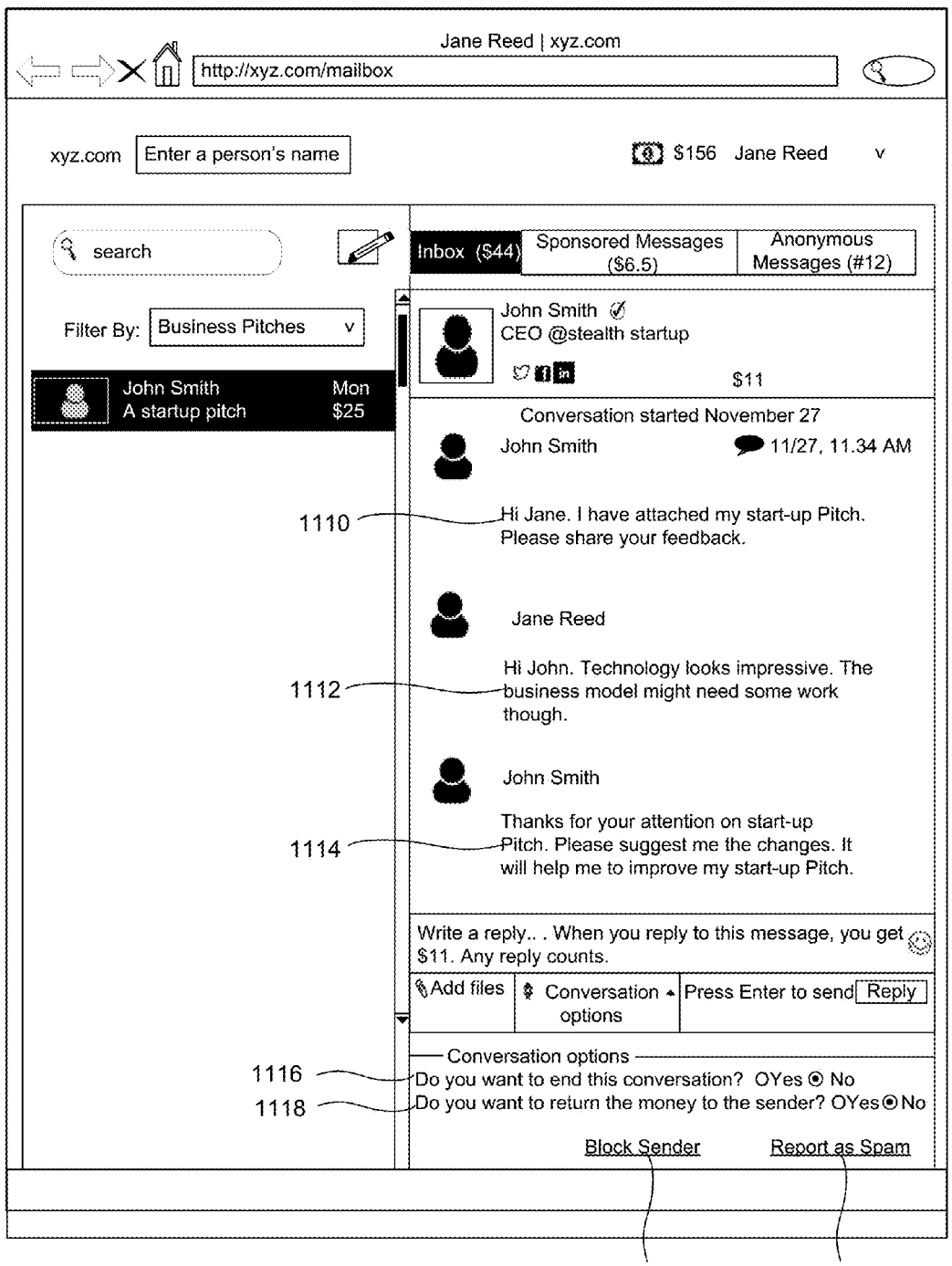

FIGS. 11A and 11B illustrate user interface views of a conversation screen within the inbox of the recipient illustrating conversation options and compensation amounts to be claimed according to an embodiment herein. The user interface view (e.g., of the mailbox module 318) includes an inbox tab 1102 to display the one or more messages received from one or more users (i.e. senders) along with a cumulative value of the money associated with these messages and display each of the messages in the inbox of the recipient along with the compensation amounts attached with each of the messages. In one embodiment, the mailbox module 318 displays the received message along with the sender name, sender designation, etc. The user interface view of the mailbox module 318 displays the message with the highest compensation associated with it as top message in the inbox tab 1102.

For example, as shown in FIG. 11A, John Smith's message is displayed as the top message if John Smith attached compensation higher than other senders (e.g., $25). While selecting the message, the mailbox module 318 displays the full message that is received from the sender (e.g., John Smith). In one embodiment, the user interface view of the mailbox module 318 provides a sort option to prioritize the messages based on the compensation attached with the messages. In another embodiment, the user interface view of the mailbox module 318 automatically prioritizes the messages based on the compensation money attached with the messages. The recipient centric messaging system 100 provides UX indicators to tell the recipient how much money he/she will get by replying to messages in their mailbox module 318 and how many messages the recipient with some indicator of the time required as well.

In one embodiment of the system, the mailbox includes tags 1109 that represent the categories specified by the recipient. These tags can be used as filters to only show the messages that are part of that category.

The user interface view further includes (i) a sponsored message tab 1104 to display sponsored messages, and (ii) an anonymous message tab 1106 to display anonymous messages which is received from the one or more senders. It may display a total amount of money 1108 available in the recipient's messaging system account and sorts the messages in order of decreasing amount of money, or a combination of money and other criteria (e.g., known to the recipient, relevance of topic etc.). The mailbox module 318 may filter the messages by the source (e.g., all messages that originated from people who found your messaging system address from Quora, or LinkedIn, or Twitter, etc). For example, the mailbox module 318 shows the messages in one category if the source of the message is LinkedIn, and it shows the messages in another category if the source of the message is Twitter, etc. The mailbox module 318 may further indicate the category of the messages (e.g., personal message, sponsored message, request for meeting, business pitch etc.) based on the recipient preferences. In one embodiment, the mailbox module 318 includes a filter to filter for only personal messages, business pitches etc. The mailbox module 318 shows the profiles of the senders and the amount of messages received from each sender.

The user interface view provides a reply option to send a reply message to the sender. The user interface view displays the conversation between the sender and the recipient (e.g., between John Smith and Jane Reed, as shown in FIG. 11B). It displays a first message 1110 received from the sender and a corresponding first reply 1112 of the recipient, and a corresponding second message 1114 received from the sender and so on. In one embodiment, the mailbox module 318 allows the recipient to send a reply (e.g., the first reply 1112) to the sender's message, and for the sender to respond to those replies (e.g., the second message 1114) in a conversation centric way. The user interface view of the mailbox module 318 provides one or more conversation options to the recipient to control the next step. The one or more conversation options include (i) end the conversation 1116 so that the sender has to start the conversation again to send a next message to the recipient, (ii) an ability to return money to the sender 1118 if the sender is known to the recipient outside the recipient centric messaging system 100 (e.g., a colleague, school mate, college mate, etc.), (iii) an ability to block the sender 1120 if the recipient received any unwanted/inappropriate message from the sender, and (iv) to report the message as spam 1122 if the message is irrelevant or inappropriate.

In one embodiment, once the recipient ends the conversation, whereby the next time the "sender" wishes to send a message to the same "recipient" the sender would be subject to all of the rules associated with starting a new conversation, such as making a payment to the recipient. In one embodiment, when the conversation is ended, the sender has to start a new conversation paying again for the new message. In one embodiment, the mailbox module 318 of the recipient centric messaging system 100 provides a feedback mechanism where the recipient can rate the sender (for example, mark their message as spam). This allows the recipient centric messaging system 100 to take appropriate action (e.g., to block future messages from that particular sender).

In one embodiment, the recipient centric messaging system 100 allows the recipients to gain privileges in the system based on their investment in the system. For example, the recipient centric messaging system 100 provides them additional free messages for every person they invite to the system. In another embodiment, the recipient centric messaging system 100 may credit a monetary equivalent that can be redeemed through messages that require payment in exchange for inviting new persons to the recipient centric messaging system 100. In case money is attached to the message, the system provides choices to the recipient to dispose of that money in flexible ways, or automatically taking action based on default preferences that the user has set for such purposes. For example, (i) Return money to the sender, (ii) donate part money to charity and keep rest for themselves, (iii) Donate all of the money to previously selected default charity, or to a freshly selected charity just for this message, and (iv) automatically donating all of the money to charity without the money actually entering the recipient's account on the system, so that there are no tax filing consequences generated for the recipient.

The embodiments disclose a recipient centric messaging system 100 where the system can enforce recipient constraints around their preferences, compensation for their attention and the ability to share their communication address freely without fear of spam. Existing messaging systems like email have no way of enforcing such recipient constraints since the existing protocols have no way of enforcing such constraints and all the existing client applications don't respect these as well. The recipient centric messaging system 100 enables enforcing recipient centric preferences that may allow recipients to indicate who might contact them, about what, on their terms, and valuing their attention. It may also provide a universal public communications address (e.g., just like an email address) that people can share with everyone and post on any public website without fear of spam and/or inappropriate messages.

Figure 12:
FIG. 12 illustrates a user interface view of a recipient profile that displays the communication preferences of the recipient according to an embodiment herein.

FIG. 12 illustrates a user interface view of a recipient profile that displays the communication preferences of the recipient according to an embodiment herein. The recipient profile displays the message rules (e.g. the communication preferences, as shown in FIG. 12A) specific to the particular recipient in one embodiment that includes that (a) the recipient only accepts messages with a minimum compensation amount, (b) the recipient only receives messages from verified senders, (c) the recipient requires a minimum stamp for professional messages, (d) the recipient require a standard stamp (e.g. 30 AUs) for promotional messages, and/or (e) that the recipient allows the attachments in the messages.

Figure 13:
FIG. 13 illustrates a user interface view of a customized message form for sending the message to the recipient according to an embodiment herein.

FIG. 13 illustrates a user interface view of a customized message form for sending the message to the recipient according to an embodiment herein. The sender may compose the message for the recipient using the customized message form for the recipient. The customized message form is automatically generated by the recipient centric messaging system based on the communication preferences of the recipient. The user interface view allows the sender to self-certify that whether the message is related to a promotional message or not, or whether it complies with the recipient's preferences. The user interface view allows the sender to set the importance of the message as Normal, Important, or Priority. If the sender set the message as a normal message, the sender may need to attach the minimum compensation amount (e.g. 0.50$). If the sender sets the message as an important message, the sender may need to attach 2.50$ as the compensation amount. If the sender sets the message as priority message, the sender may need to attach 5.0$ as the compensation amount for the recipient. If the recipient does not reply to the message within a week, the compensation amount is returned to the sender account. The user interface view allows the sender to send the message to the recipient when the sender selects a box that confirms that the message respects the recipient communication preferences.

Figure 14B:
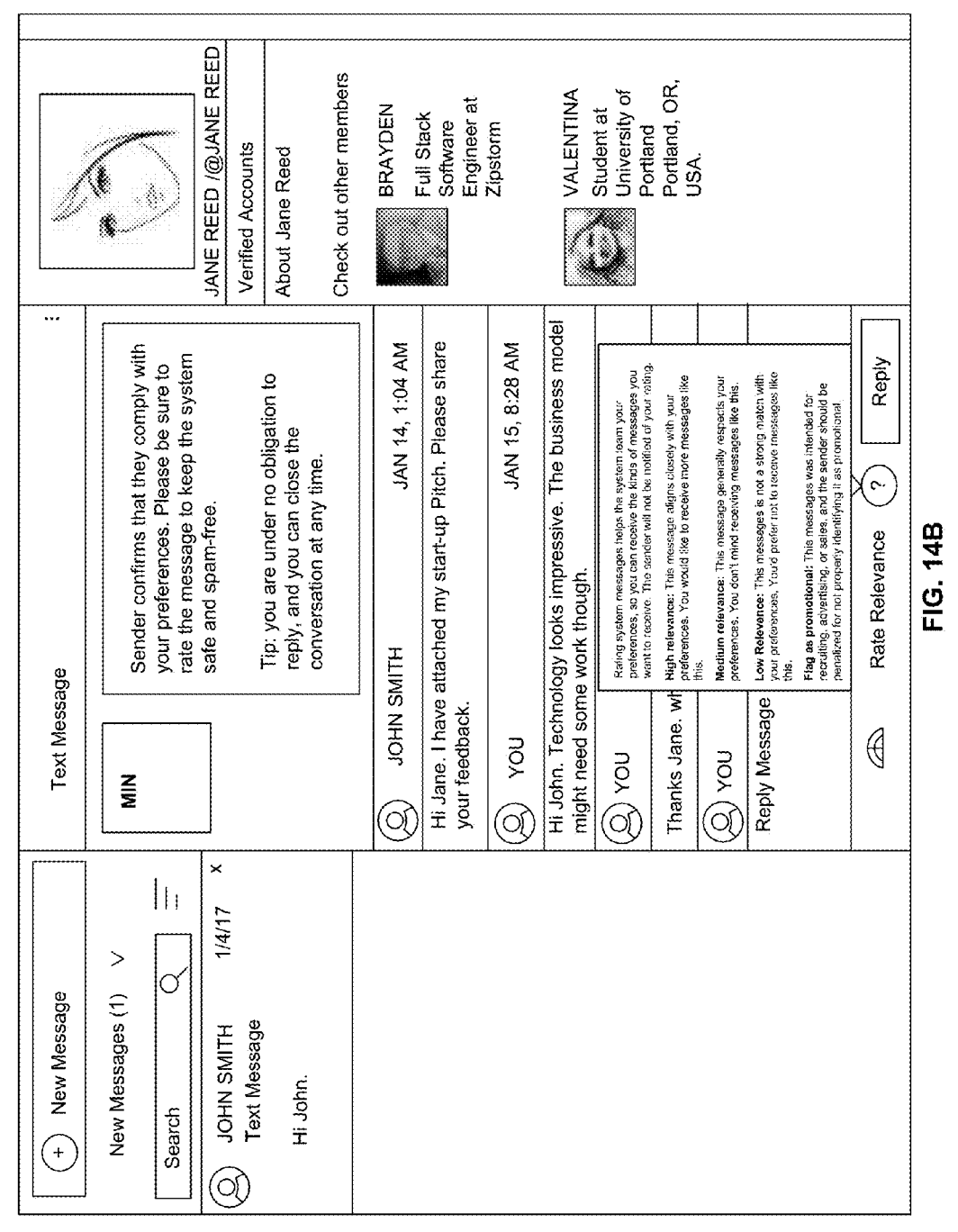

FIGS. 14A and 14B illustrate user interface views of the recipient centric messaging system 100 of FIG. 1 for determining a reputation score for the sender based on feedback from a recipient according to an embodiment herein. The recipient centric messaging system 100 may determine the reputation score for the sender based on feedback from the recipient on (i) a priority level of the message, (ii) whether the message is properly classified by the sender, and/or (iii) whether the message is offensive or inappropriate to the recipient. The sender may report to the recipient centric messaging system 100 that the message sent by the sender is promotional or an offensive message. The relevance of the message for the recipient is rated as Low, Medium or High (as shown in FIG. 14A) by the recipient. The relevance rating will in turn influence the reputation score of the sender. If the reputation score for the sender is below the threshold reputation score, the sender is not allowed to sending free messages. The recipient may rate the message as high relevance when the message is relevant to a topic of interest and the recipient centric messaging system 100 allows such messages from the recipients in the future. The recipient may report the message as promotional when the message intended for recruiting, marketing, advertising, or sales and the sender should be penalized for not properly identifying that the message sent was promotional.

FIG. 14A depicts a conversation between the sender and the recipient. For example, John Smith may send the first message to Jane Reed about a start-up pitch (e.g. Hi Jane. I have attached my Start-up Pitch in PDF format. Please share your feedback.). John Smith must attach a compensation amount for the first message if Jane Reed specified in her communication preferences that she only receives messages if a minimum compensation amount attached. Jane Reed sends a reply message to John Smith in a conversation thread. Jane Reed may end the conversation when John Smith sends a second message that she consider irrelevant. Further, Jane Reed may mark the priority of the second message as low, which may reduce the reputation score of John Smith.

Figure 15A:
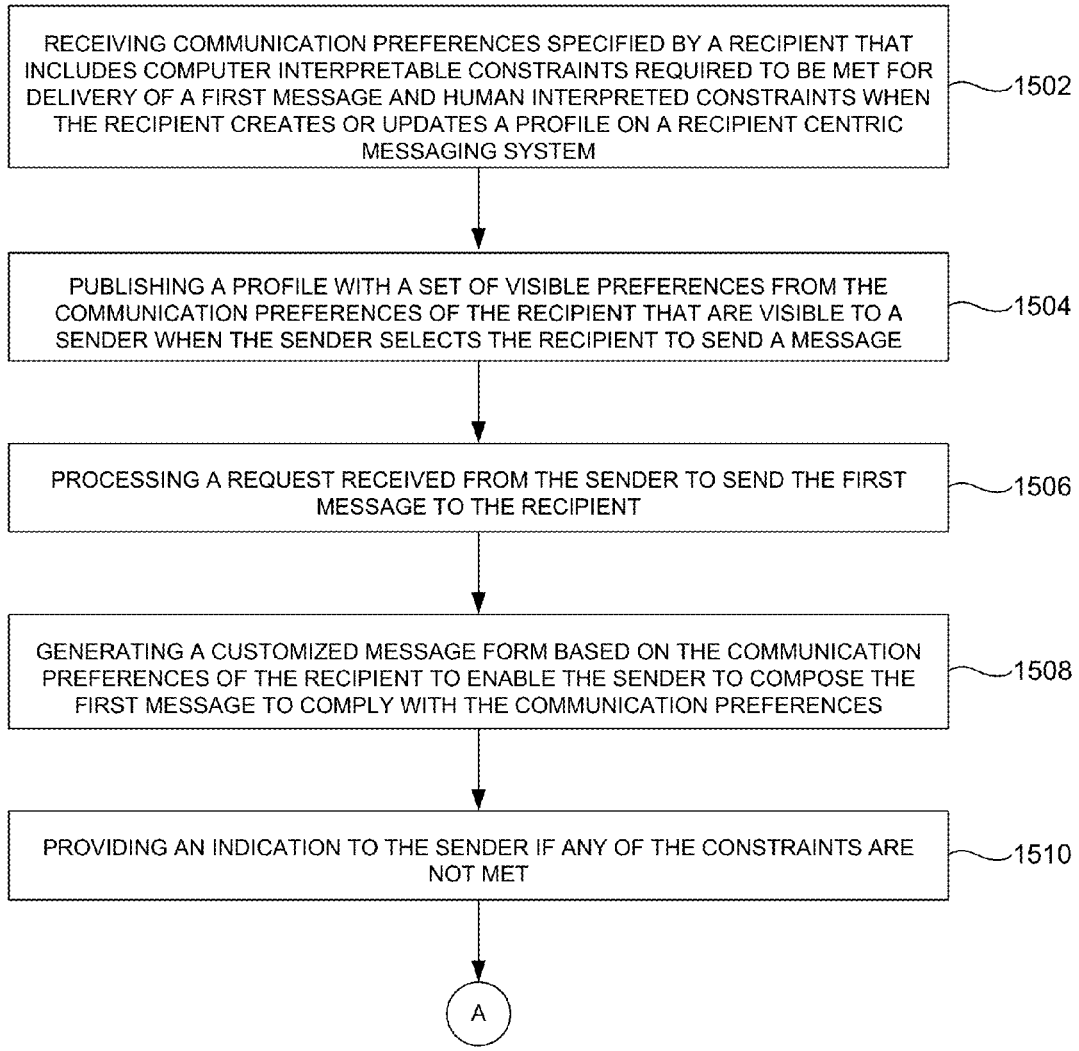
FIGS. 15A and 15B are flow diagrams illustrating a method of communicating at least one message between the sender and the recipient using a communications protocol over a data network through the recipient centric messaging system according to an embodiment herein.
Figure 15B:
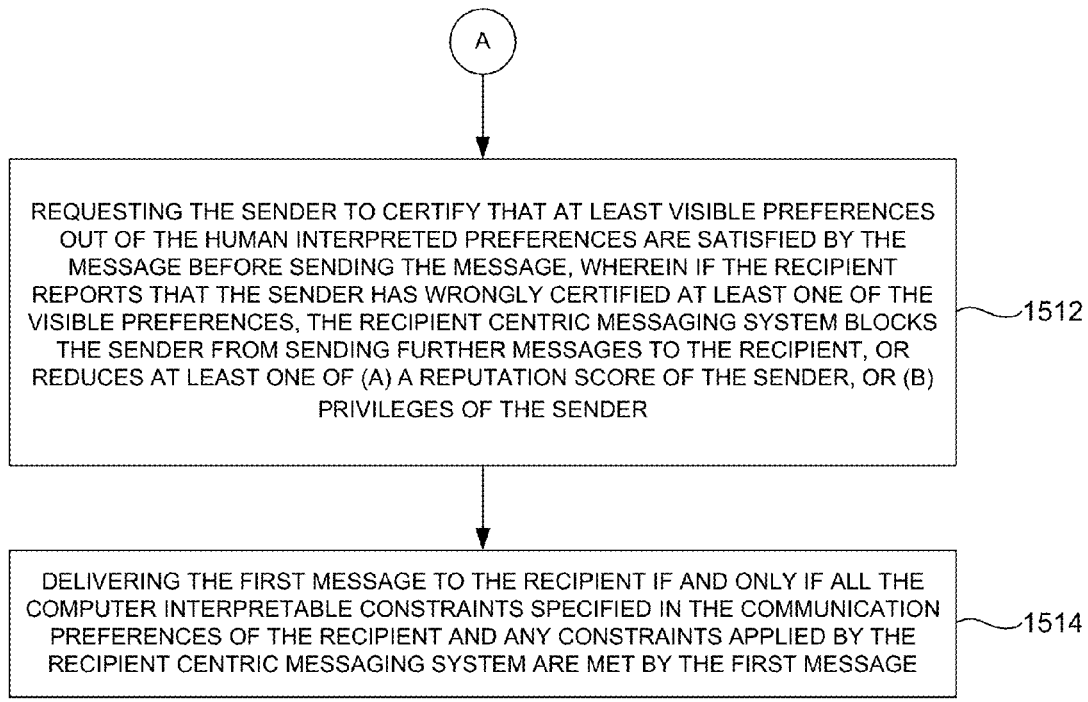

FIGS. 15A and 15B are flow diagrams illustrating a method of communicating at least one message between the sender and the recipient using a communications protocol over a data network through the recipient centric messaging system 100 according to an embodiment herein. At step 1502, the recipient centric messaging system 100 receives the communication preferences specified by the recipient that includes computer interpretable constraints required to be met for delivery of a first message and human interpreted constraints when the recipient creates or updates a profile on the recipient centric messaging system 100. At step 1504, the recipient centric messaging system 100 publishes the profile with a set of visible preferences from the communication preferences of the recipient that are visible to the sender when the sender selects the recipient to send a message. At step 1506, the recipient centric messaging system 100 processes a request received from the sender to send the first message to the recipient. At step 1508, the recipient centric messaging system 100 generates a customized message form based on the communication preferences of the recipient to enable the sender to compose the first message to comply with the communication preferences. At step 1510, the recipient centric messaging system 100 provides an indication to the sender if any of the constraints are not met. At step 1512, the recipient centric messaging system 100 requests the sender to certify that at least visible preferences out of the human interpreted preferences are satisfied by the message before sending the message. If the recipient reports that the sender has wrongly certified at least one of the visible preferences, the recipient centric messaging system 100 blocks the sender from sending further messages to the recipient, or reduces at least one of (a) a reputation score of the sender, or (b) privileges of the sender. The privileges may include free messages provided to the recipient. At step 1514, the recipient centric messaging system 100 delivers the first message to the recipient if and only if all the computer interpretable constraints specified in the communication preferences of the recipient and any constraints applied by the recipient centric messaging system are met by the first message.

Figure 16:
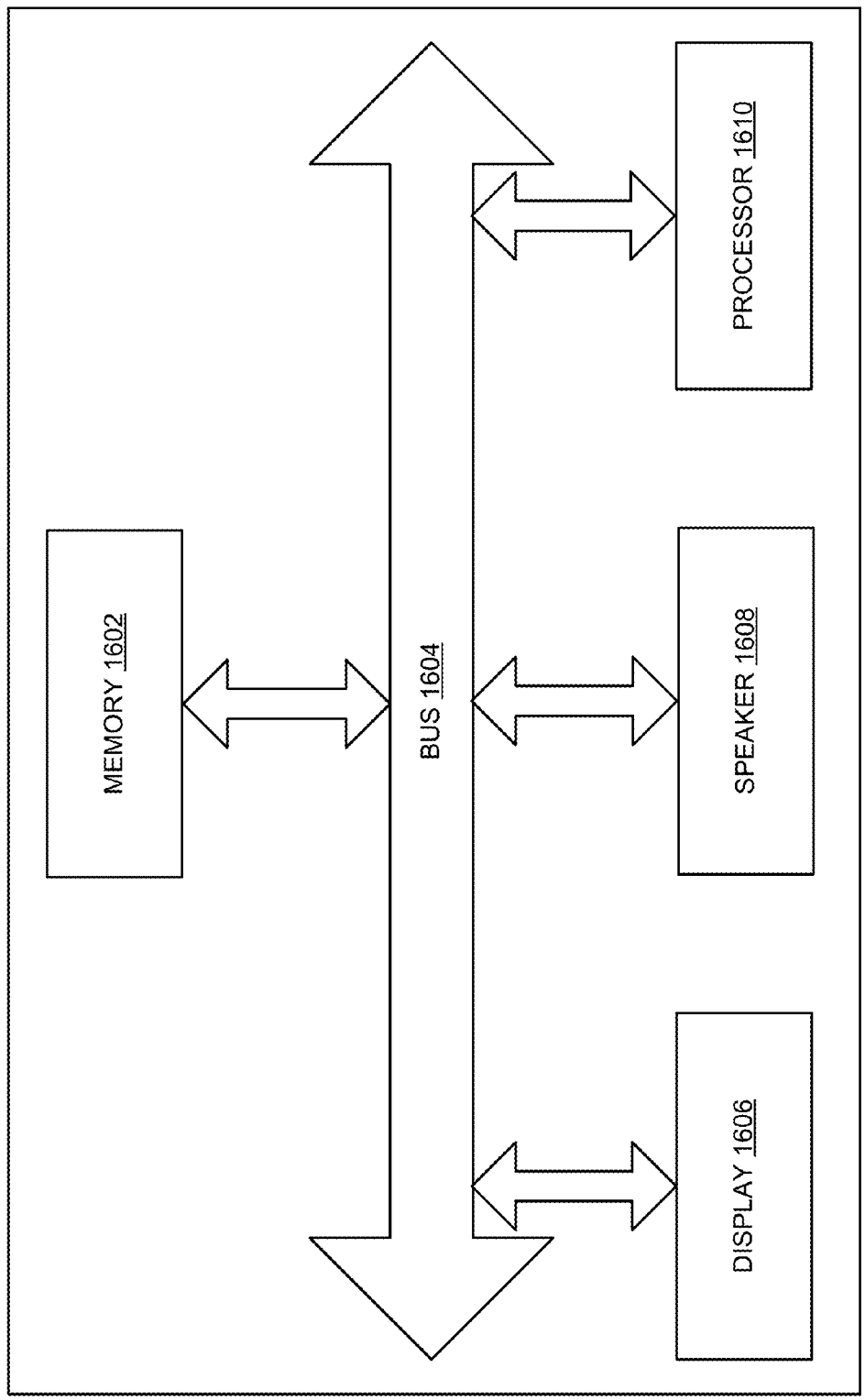
FIG. 16 illustrates an exploded view of a device that may be used to access the recipient centric messaging system of FIG. 1 according to the embodiments herein.

FIG. 16 illustrates an exploded view of the personal communication device having a memory 1602 having a set of computer instructions, a bus 1604, a display 1606, a speaker 1608, and a processor 1610 capable of processing a set of instructions to perform any one or more of the methodologies herein, according to an embodiment herein. In one embodiment, the receiver may be the personal communication device. The processor 1610 may also enable digital content to be consumed in the form of video for output via one or more displays 1606 or audio for output via speaker and/or earphones 1608. The processor 1610 may also carry out the methods described herein and in accordance with the embodiments herein.

Digital content may also be stored in the memory 1602 for future processing or consumption. The memory 1602 may also store program specific information and/or service information (PSI/SI), including information about digital content (e.g., the detected information bits) available in the future or stored from the past. A user of the personal communication device may view this stored information on display 1606 and select an item of for viewing, listening, or other uses via input, which may take the form of keypad, scroll, or other input device(s) or combinations thereof. When digital content is selected, the processor 1610 may pass information. The content and PSI/SI may be passed among functions within the personal communication device using the bus 1604.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 17:
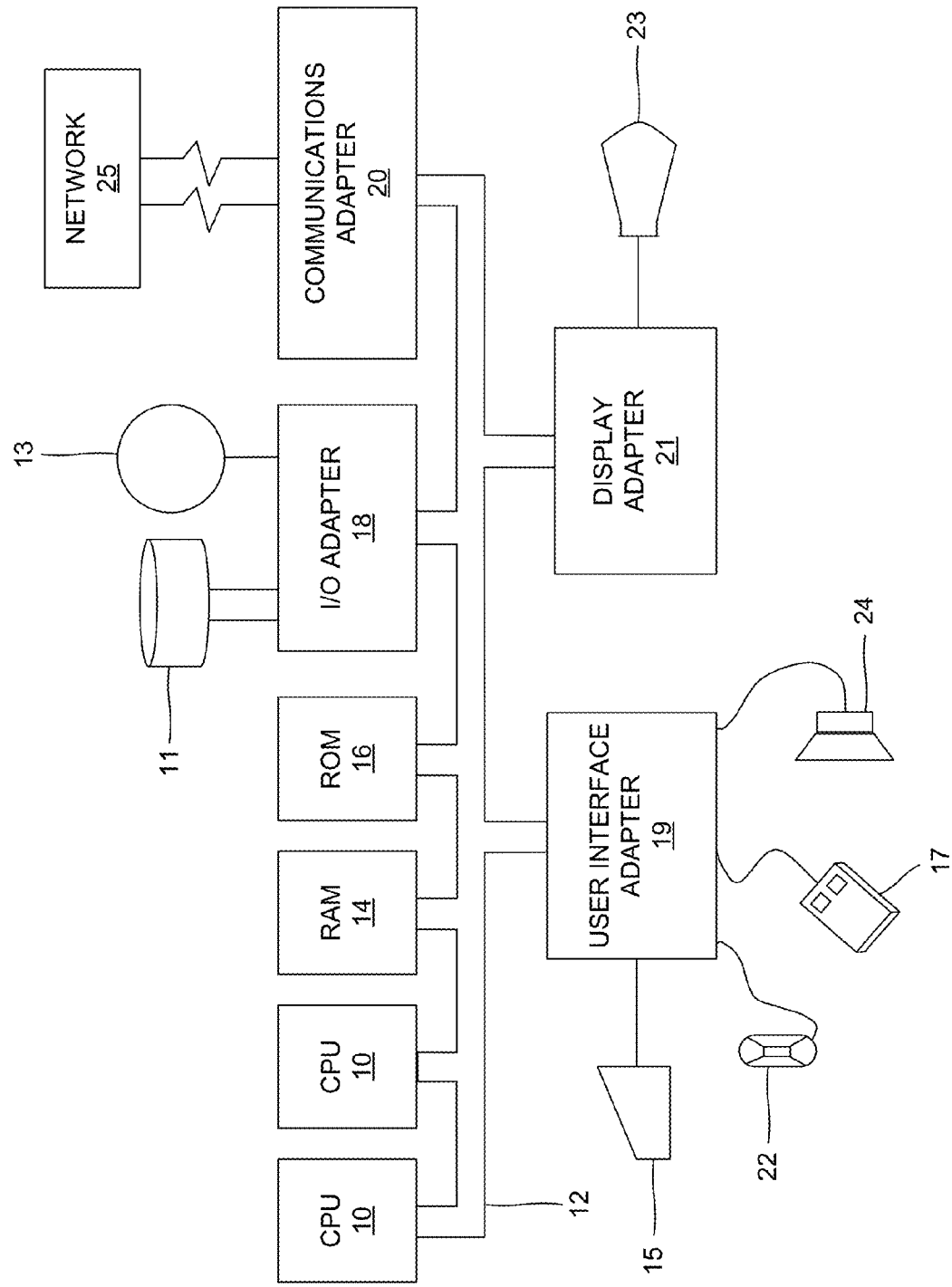
FIG. 17 a schematic diagram of computer architecture used in accordance with the embodiments herein.

A representative hardware environment for practicing the embodiments herein is depicted in FIG. 17. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The recipient centric messaging system 100 may provide a single public communication address to be used on any public website and keeps the context of the messages received from different websites (e.g., a user might have a LinkedIn address, a reddit address, a craigslist address, a contact form on a blog etc., and they have to check their messages across all of these sites).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of communicating at least one message between a sender and a recipient using a communications protocol over a data network through a recipient centric messaging system, comprising:

receiving, at the recipient centric messaging system, communication preferences specified by said recipient that comprise (a) computer interpretable constraints required to be met for delivery of a first message and (b) human interpreted constraints when said recipient creates or updates a profile on said recipient centric messaging system;

publishing said profile, on the recipient centric messaging system, with a set of visible preferences from said communication preferences of said recipient that are visible to said sender when said sender selects said recipient to send a message;

the recipient centric messaging system processing a request received from said sender to send said first message to said recipient;

the recipient centric messaging system generating a customized message form based on said communication preferences of said recipient to enable said sender to compose said first message to comply with said communication preferences;

the recipient centric messaging system receiving the first message sent using the customized form;

the recipient centric messaging system dynamically assessing whether any of said computer interpretable constraints and human interpreted constraints are not met using (a) natural-language processing upon user-profiles including communications preferences of both said sender and said recipient and (b) a machine-learning based reputation-and-penalty scoring system based on all prior messages sent by said sender to a plurality of users and any associated responses, wherein the dynamically assessing comprises: the recipient centric messaging system dynamically processing said first message to determine if (a) all said computer interpretable constraints, which include a reputation score of said sender and (b) any penalties assigned by the recipient centric messaging system to said sender are satisfied by said first message; and the recipient centric messaging system delivering said first message over said data network using said communications protocol to said recipient if and only if all said computer interpretable constraints specified in said communication preferences of said recipient and any reputation-constraints applied by said recipient centric messaging system are met by said first message, wherein said recipient centric messaging system is integrated with an email service via an email-proxy-server capable of implementing any computer interpretable constraints, human interpreted constraints, and reputation-constraints required or imposed by the recipient centric messaging system.

2. The method of claim 1, wherein said communication preferences comprise multiple categories of communications that are set up by said recipient based on (a) properties of senders, or (b) properties of communicated content, wherein different constraints are specified by said recipient for different categories of communications, and wherein said communications preferences are specified as a logic formula with (a) AND, (b) OR, and (c) NOT operators separating constraints, and wherein communications preferences comprise at least one of: (i) a limit on a number of characters in said message, (ii) a specification on whether images or attachments are allowed or not, (iii) a compensation amount that is required for delivery of said message, (iv) a threshold reputation score of said sender required for delivery of said message, and (v) a volume of message traffic received by said recipient that is associated with a category of communication selected from said different categories of communications.

3. The method of claim 1, wherein a compensation amount is suggested by said recipient centric messaging system based on at least one of (i) amounts associated with existing messages received by said recipient and priorities of said existing messages in order to increase a priority of said message for said recipient, (ii) one or more properties of content associated with said message, wherein said one or more properties of content comprises a length of a video that is attached with said message, and (iii) an amount of attention required by said recipient.

4. The method of claim 3, wherein said compensation amount comprises virtual currency selected from at least one of (a) points and (b) virtual goods.

5. The method of claim 1, further comprising:

requesting said sender to certify that at least visible preferences out of said human interpreted preferences are satisfied by said message before sending said message, wherein if said recipient reports that said sender has wrongly certified at least one of said visible preferences, said recipient centric messaging system blocks said sender from sending further messages to said recipient, or reduces at least one of (a) said reputation score of said sender, and (b) privileges of said sender, wherein said privileges comprise free messages provided to said recipient.

6. The method of claim 1, further comprising:

allowing a limited number of free messages within a given time period if said sender and said recipient (a) share the same alma mater, or (b) said sender and said recipient previously worked for the same employer.

7. The method of claim 1, wherein said constraints applied by said recipient centric messaging system comprise a limit to a number of messages that said sender can send without a compensation amount, wherein said number of messages that are allowed to be sent without said compensation amount is determined based on one or more of (a) said reputation score of said sender, and (b) a regulation applicable to said recipient for receiving compensation.

8. The method of claim 2, wherein said communication preferences comprise an indication that one or more of said computer interpretable constraints, human interpreted constraints, and reputation-constraints are not enforced on one or more senders or types of senders.

9. The method of claim 1, wherein said request is received from said sender to send said first message when said sender selects a URL of a unique communication address associated with said recipient within said recipient centric messaging system from a source outside of said recipient centric messaging system, said method further comprising:
verifying whether said sender is logged on to said recipient centric messaging system or not; and
enabling said sender to login to said recipient centric messaging system if said sender is not already logged in to said recipient centric messaging system,
wherein said recipient centric messaging system automatically captures a URL of said source as metadata to be attached to said first message, and generates said customized message form based on said communication preferences of said recipient on selecting said URL once said sender is logged in to said recipient centric messaging system.

10. The method of claim 9, further comprising:
filtering and classifying said messages in an inbox of said recipient in said recipient centric messaging system based on said URL of said source outside of said recipient centric messaging system.

11. The method of claim 2, further comprising:
delivering said first message to said recipient if and only if a minimum compensation amount is attached with said first message; and
returning at least a part of said compensation amount to said sender when said recipient does not send a reply to said message within a predefined period of time.

12. The method of claim 2, wherein said recipient centric messaging system does not deliver said first message to said recipient if said reputation score of said sender is less than said threshold reputation score specified in said communication preferences.

13. The method of claim 1, further comprising:
verifying said message and when at least one of said human interpreted constraints specified in said communication preferences or said computer interpretable constraints specified by said recipient centric messaging system are not met by said message, not delivering said message, notifying said sender that at least one of said human interpreted constraints and said computer interpretable constraints is not met, and enabling said sender to modify said message to meet said human interpreted constraints and said computer interpretable constraints.

14. The method of claim 1, further comprising:
processing a first reply from said recipient to said first message; and
crediting a first compensation amount associated with said first message by said sender to said recipient only when said recipient sends said first reply to said sender.

15. The method of claim 14, further comprising:
processing a request from said recipient to end a conversation between said sender and said recipient; and
disabling an option for said sender to reply to or to send another message in a current conversation thread that comprises said first message and said first reply in response to said request to end said conversation.

16. The method of claim 1, further comprising:
notifying said recipient about said message by sending an email when said recipient receives said first message on said recipient centric messaging system from said sender, wherein said recipient centric messaging system sends one notification for a plurality of emails that are specific to said recipient.

17. The method of claim 16, further comprising providing an option to said recipient to send an email reply to said first message directly from said email service using a reply button that is associated with said email and a protocol, wherein said email reply first goes to said email-proxy-server and is routed to said recipient centric messaging system when said recipient selects said reply button.

18. The method of claim 17, wherein said email-proxy-server receives said email from said email service and parses (a) details of said recipient within said recipient centric messaging system, and (b) a type of message received from said sender, wherein said email-proxy-server further (a) identifies what message said email is in response to, (b) decides whether any compensation is required to send a reply, and (c) generates an interface to compose and send said reply to said received email using an application programming interface (API) of the recipient centric messaging system.

19. The method of claim 1, further comprising:
deleting a message from said recipient centric messaging system in response to selection of a reject button that is associated with said recipient centric messaging system, wherein said recipient is not credited any compensation attached with said message when said message is rejected.

20. One or more non-transitory computer readable storage mediums storing one or more sequences of instructions for communicating at least one message between a sender and a recipient using a communications protocol over a data network through a recipient centric messaging system, which when executed by one or more processors, cause:
receiving, at the recipient centric messaging system, communication preferences specified by said recipient that comprise (a) computer interpretable constraints required to be met for delivery of a first message and (b) human interpreted constraints when said recipient creates or updates a profile on said recipient centric messaging system;
publishing said profile, on the recipient centric messaging system, with a set of visible preferences from said communication preferences of said recipient that are visible to the sender when said sender selects said recipient to send a first message;
the recipient centric messaging system processing a request, received from said sender, to send said first message to said recipient;
the recipient centric messaging system generating a customized message form based on said communication preferences of said recipient to enable said sender to compose said first message to comply with said communication preferences;
the recipient centric messaging system receiving the first message sent using the customized form;
the recipient centric messaging system receiving the first message sent using the customized form;
the recipient centric messaging system dynamically assessing whether any of said computer interpretable constraints and human interpreted constraints are not met using (a) natural-language processing upon user-profiles including communications preferences of both said sender and said recipient and (b) a machine-learning based reputation-and-penalty scoring system based on all prior messages sent by said sender to a plurality of users and any associated responses, wherein the dynamically assessing comprises: the recipient centric messaging system dynamically processing said first message to determine if (a) all said computer interpretable constraints, which include a reputation score of said sender and (b) any penalties assigned by the recipient centric messaging system to said sender are satisfied by said first message;

the recipient centric messaging system delivering said first message over said data network using said communications protocol to said recipient if and only if all said computer interpretable constraints specified in said communication preferences of said recipient and any reputation-constraints applied by said recipient centric messaging system are met by said first message;

the recipient centric messaging system processing a first reply to said message from said recipient by publishing a conversation screen that comprises said first message received from said sender and said first reply message of said recipient; and the recipient centric messaging system crediting a compensation associated with said first message by said sender to a payment recipient specified by said recipient in said communication preferences, wherein said recipient centric messaging system is integrated with an email service via an email-proxy-server capable of implementing any computer interpretable constraints, human interpreted constraints, and reputation-constraints required or imposed by the recipient centric messaging system.

21. The one or more non-transitory computer readable storage mediums of claim 20, further comprising:

the recipient centric messaging system requesting said sender to certify that at least visible preferences out of said human interpreted preferences are satisfied by said message before sending said message, wherein if said recipient reports that said sender has wrongly certified at least one of said visible preferences, said recipient centric messaging system blocks said sender from sending further messages to said recipient, or reduces at least one of (a) a reputation score of said sender, and (b) privileges of said sender, wherein said privileges comprise free messages provided to said recipient.

22. A recipient centric messaging system for communicating at least one message between a sender and a recipient using a communications protocol over a data network, wherein said recipient centric messaging system comprises:

a memory that stores (i) a database that stores (a) a plurality of communication preferences for said plurality of users, (b) information about said plurality of users, and (c) a plurality of message forms, and (d) monetary details of a sender account and a recipient account, and (ii) a set of modules;

one or more processors that execute said set of modules, wherein said set of modules comprises:

a preferences customization module, executed by said one or more processors, that specifies communication preferences that comprise computer interpretable constraints for receiving messages from said sender;

a message customization module, executed by said one or more processors, that automatically generates a customized message form based on said recipient communication preferences to compose a first message, wherein said customized message form is configured to transmit messages composed using the customized message form to said recipient centric messaging system;

a preferences displaying module, executed by said one or more processors, that displays at least one of said communication preferences of said recipient to said sender in said customized message form;

a compensation determination module, executed by said one or more processors, that determines said compensation amount to attach with said first message to get attention from said recipient;

a constraints applying module, executed by said one or more processors, that dynamically verifies whether said computer interpretable constraints are mentioned in said communication preferences are met by said first message and human interpreted constraints to send said first message to said recipient using (a) natural-language processing upon user-profiles including communications preferences of both said sender and said recipient and (b) a machine-learning based reputation-and-penalty scoring system based on all prior messages sent by said sender to a plurality of users and any associated responses, wherein the dynamically assessing comprises the constraints applying module dynamically processing said first message to determine if (a) all said computer interpretable constraints, which include a reputation score of said sender and (b) any penalties assigned by the recipient centric messaging system to said sender are satisfied by said first message; and a compensation providing module, executed by said one or more processors, that transfers said compensation amount attached with said first message to said recipient along with said first message when said first message is delivered and when said recipient sends a reply to said first message.

23. The system of claim 22, wherein said compensation providing module credits a percentage of said compensation amount for said first message to an account associated with said recipient centric message system for facilitating said messaging and for exchange of said compensation amount from said sender to said recipient.

24. The system of claim 22, wherein said compensation providing module provides privileges to said recipient that comprises at least one of (a) credit a compensation amount to a recipient centric messaging system account of said recipient, and (b) provide free messages to said recipient when said recipient invite a new user to said recipient centric messaging system.

25. The system of claim 22, wherein said recipient centric messaging system further comprises:

a sender verification module, executed by said processor, that verifies said sender when said communication preferences of said recipient require senders to be verified before sending said first message, wherein said verifying comprises at least one of verifying (a) a social network account of said sender, (b) an email account of said sender, (c) a phone number of said sender, and (d) personal documents of said sender and not delivering said first message when said sender is not verified, wherein said recipient specifies that said sender has to be verified for said first message to be delivered.

26. The system of claim 22, wherein said recipient centric messaging system further comprises:

a combined search module, executed by said one or more processors, that searches for said recipient based on attributes of said plurality of registered users comprising (a) a dynamic location of a user, (b) a name or designation of said user, (c) an age and a gender of said user, (d) current or past companies of said user, (e) industry-segments of said user, or (f) educational institutions of said user to send said message, wherein said communication preferences of said recipient is displayed to said sender when selecting said recipient to send said message; and a refund module, executed by said one or more processors, that provides choices to said recipient to (i) return said compensation money to said sender, (ii) donate part of said compensation money to a charity and keep the remaining money for said recipient, or (iii) donate said compensation money to said charity, or to a newly selected charity for said message, wherein said refund module returns said compensation money to said sender of said first message when said recipient does not provide attention to said first message for a certain passage of time, wherein said refund module automatically donates said compensation money to said charity without said compensation money entering to a recipient centric message system account of said recipient.

27. The system of claim 22, wherein said recipient centric messaging system further comprises:

a message prioritizing module, executing by said one or more processors, that receives said first message from said sender and prioritizes said first message in said recipient inbox based at least one of (i) whether said sender is known to said recipient, and (ii) said compensation amount attached with said first message;

a mailbox module, executed by said one or more processors, that manages said messages received from different recipients, wherein said mailbox module determines a current placement of said first message in an inbox of said recipient based on said compensation amounts associated with other messages in said inbox, wherein said mailbox module (a) determines a cumulative value of compensation amounts associated with said messages in said inbox, (b) displays said cumulative value of said compensation amounts associated with said messages in said inbox of said recipient, and (c) displays each of said messages in said inbox of said recipient along with said compensation amounts attached with each of said messages, and (d) sorts said messages in decreased order of said compensation amount associated with said messages; and a reputation scoring module, executed by said one or more processors, that determines a reputation score for said sender based on feedback from said recipient on at least one of (i) a priority level of said first message, (ii) whether said first message is properly classified by said sender, and (iii) whether said message is offensive or inappropriate to said recipient.

28. The system of claim 27, wherein said reputation scoring module further determines said reputation score for said sender based on an analysis of a message history of said sender using predefined rules based on at least one of (a) a number of messages sent by said sender to said recipient, (b) a fraction or percentage of messages marked as irrelevant messages by said recipient, and (c) a fraction or percentage of messages replied to by said recipient.

29. The system of claim 22, wherein said recipient centric messaging system further comprises a reputation scoring module that determines a reputation score for said sender using a machine learning algorithm which analyzes a plurality of parameters selected from a group consisting of (a) a number of messages sent by said sender to one or more recipients, (b) a fraction or percentage of messages replied to by said one or more recipients, (c) relevance ratings assigned to said messages by said one or more recipients, (d) a length of replies sent by said recipient, and (e) sentiment analysis of said messages.

30. The system of claim 22, wherein said recipient centric messaging system comprises a set of application programming interfaces and a protocol that specifies how said sender can send said messages and how said recipient can receive said messages over said recipient centric messaging system, wherein said protocol comprises specific requirements for honoring said communications preferences, wherein said recipient centric messaging system displays said communication preferences of said recipient and enforces compliance with said communication preferences in said application programming interface by said sender when said sender selects said recipient to send said message.

* * * * *